(12) United States Patent
Smith et al.

(10) Patent No.: US 11,989,762 B2
(45) Date of Patent: May 21, 2024

(54) ELIGIBILITY FOR ACCESS TO RESTRICTED GOODS AND SERVICES USING ZERO-KNOWLEDGE PROOFS

(71) Applicant: Civic Technologies, Inc., San Francisco, CA (US)

(72) Inventors: Jonathan R. Smith, Oakland, CA (US); Vinodan K. Lingham, Los Altos, CA (US); Stephen Smit, San Mateo, CA (US)

(73) Assignee: CIVIC TECHNOLOGIES, INC., San Francisco, CA (US)

( * ) Notice: Subject to any disclaimer, the term of this patent is extended or adjusted under 35 U.S.C. 154(b) by 25 days.

(21) Appl. No.: 17/054,470

(22) PCT Filed: May 10, 2019

(86) PCT No.: PCT/US2019/031890
§ 371 (c)(1),
(2) Date: Nov. 10, 2020

(87) PCT Pub. No.: WO2019/217936
PCT Pub. Date: Nov. 14, 2019

(65) Prior Publication Data
US 2021/0065267 A1 Mar. 4, 2021

Related U.S. Application Data

(60) Provisional application No. 62/669,923, filed on May 10, 2018.

(51) Int. Cl.
*G06Q 30/0601* (2023.01)
*G06Q 20/38* (2012.01)
*G07F 9/00* (2006.01)

(52) U.S. Cl.
CPC ... *G06Q 30/0607* (2013.01); *G06Q 20/38215* (2013.01); *G06Q 20/3827* (2013.01);
(Continued)

(58) Field of Classification Search
CPC ............................. G06Q 30/0607; G07F 9/009
See application file for complete search history.

(56) References Cited

U.S. PATENT DOCUMENTS 11,423,367 B2 * 8/2022 Arora ..................... G06Q 20/02
2004/0153421 A1 8/2004 Robinson
(Continued)

OTHER PUBLICATIONS

Nation's first identity-verifying marijuana vending machine makes debut in colorado, amid minor setbacks. (Apr. 22, 2014). PRWeb Newswire (Year: 2014).*
(Continued)

*Primary Examiner* — Michael Misiaszek
(74) *Attorney, Agent, or Firm* — Volpe Koenig

(57) ABSTRACT

Systems and methods for identity verification to provide access to restricted goods or services. A first device may receive, from a second device operated on behalf of a user, a first request to purchase a restricted good or service. The first device may transmit, to the second device responsive to the first request, a second request comprising an identification of information of the user, and an identification of validation system; and may receive the requested information of the user. The first device may generate an attestation key comprising a hash of the requested information of the user and the identification of the validation system; and may determine that a record in a centralized or distributed ledger at an address corresponding to the attestation key is associated with a non-zero transaction value. Responsive to the determination, the first device may provide the restricted good or service to the user.

21 Claims, 18 Drawing Sheets

(52) U.S. Cl.
CPC ......... *G06Q 30/0609* (2013.01); *G07F 9/002* (2020.05); *G07F 9/009* (2020.05)

(56) References Cited

U.S. PATENT DOCUMENTS

| | | | |
|---|---|---|---|
| 2009/0313129 A1 | 12/2009 | Rothschild | |
| 2015/0356523 A1 | 12/2015 | Madden | |
| 2017/0222814 A1* | 8/2017 | Oberhauser | G06Q 20/4014 |
| 2017/0316390 A1* | 11/2017 | Smith | G06Q 20/3674 |
| 2018/0082268 A1* | 3/2018 | Sheerin | G06Q 20/4014 |
| 2018/0121912 A1* | 5/2018 | Morales | G06Q 20/3829 |
| 2019/0034926 A1* | 1/2019 | Davis | G06Q 20/223 |
| 2020/0219099 A1* | 7/2020 | Mohassel | G06Q 40/02 |
| 2021/0119785 A1* | 4/2021 | Ben-Reuven | H04L 63/126 |
| 2021/0365915 A1* | 11/2021 | Kaufman | G07F 11/00 |

OTHER PUBLICATIONS

Blockchain and Digital Signatures for Digital Self-Sovereignty. Patel, Brijesh B.. ProQuest Dissertations and Theses ProQuest Dissertations Publishing. (2018) (Year: 2018).*

International Preliminary Report on Patentability for PCT appln. PCT/US2019/031890 dated Nov. 19, 2020.

International Search Report and Written Opinion of the International Searching Authority on PCT/US2019/031890, dated Sep. 20, 2019.

* cited by examiner

400

```
Service provider A verifies the user's PII using its existing
verification methods
400
          │
          ▼
Service provider A records an attestation to the PII on
blockchain
402
          │
          ▼
Service provider A agrees to a price for the attestation of
the user's PII with service provider B
404
          │
          ▼
When a user provides requested PII to service provider B,
tokens are released from escrow
406
```

FIG. 4A

| Level | P |
|---|---|
| 10,000 | 99.99% |
| 1,000 | 99.90% |
| 100 | 99.00% |
| 13.52 | 92.60% |
| 2.5 | 60.00% |

User approaches service provider attempting to purchase a good
1200

Service provider indicates eligibility requirements for purchasing the good
1210

Service provider indicates to user what information from user that service provider requires and which validators service provider trusts
1220

User provides information to service provider that indicates user is eligible to purchase the good
1230

User provides requested information to service provider
1240

Service provider validates the information provided by the user.
1250

Responsive to validating the information provided by the user, determine if user is eligible to purchase the good
1260

FIG. 12

ELIGIBILITY FOR ACCESS TO RESTRICTED GOODS AND SERVICES USING ZERO-KNOWLEDGE PROOFS

RELATED APPLICATIONS

This application claims the benefit of and priority as a national stage application under 35 U.S.C. § 371 to International Patent Application No. PCT/US2019/031890, entitled "Eligibility for Access to Restricted Goods and Services Using Zero-Knowledge Proofs," filed May 10, 2019; which claims the benefit of and priority to U.S. Provisional Application No. 62/669,923, entitled "Eligibility for Access to Restricted Goods and Services Using Zero-Knowledge Proofs," filed May 10, 2018, the entirety of which is incorporated by reference herein.

FIELD OF THE DISCLOSURE

The present disclosure generally relates to systems and methods for managing the identity of users and methods for determining the eligibility of users for access to restricted goods and services.

BACKGROUND

Banks and financial institutions may be required to verify the identity of a customer and to verify the authenticity of information provided by that customer when the customer seeks access to a new product or service, for example when opening a new account or applying for a loan. This trend has quickly spilled over into other sectors, particularly considering the rise in e-commerce and our increasingly digital lives. The result of this trend is that digitized personal information is constantly increasing, as are security breaches and data theft.

The ability to store and share information digitally offers many benefits, and the digitization of data has increasingly grown. However, alongside the advantages of cost and convenience, the ability to copy and share data has raised questions about the security and privacy of personal data. There have been many high-profile hacks, leaks, and theft of personal information, as well as cases where unencrypted data has simply been lost or left vulnerable to theft. In 2016 alone, 15.4 million adults in the U.S. were victims of identity fraud, an increase of 16% over 2015, and victims suffered losses amounting to $16 billion. Personal identifiable information (PII) was the most common form of data stolen, accounting for almost 43% of data breaches, and the services industry was most affected by data breaches, accounting for almost double the occurrence of the finance, insurance, and real estate sectors combined.

Inefficiencies in the identity verification industry have both financial and social costs. Without proof of identity, an individual may be unable to exercise a range of legal rights, including the ability to vote, access health care, and receive social welfare. Lack of identity documentation and the high costs of obtaining it means that many individuals globally are wholly or partially denied access to banking facilities. In low-income countries, new births often go unregistered because parents struggle to acquire the necessary documentation to have verified and recorded reliably by the relevant authorities. It may be difficult for companies or individuals offering goods or services to determine the eligibility of an individual to access the good or services because the individual may misrepresent their identity or some aspect of their identity, which can cause the company or individual offering the goods or services to be misled into providing the good or service, which may cause them legal, personal, reputational, and financial harm.

In addition to identity verification processes often being intrusive or time-consuming to consumers, they come at a significant cost to the financial institutions required to carry them out as a matter of law and to avoid commercial losses due to fraud. It may cost a financial institution such as a bank $15 or more to on-board a single customer and verify their identity and personal information. This process gets repeated every time the same consumer tries to access another product or service, despite the process being similar, if not identical, for most organizations. The time it takes to initially validate information has a detrimental impact on customer relations and invariably also impacts customer acquisition and conversion rates for the sales of products where verification of consumer identity or information is required. Consumers are forced to fill in lengthy application forms and provide extensive personal information, and institutions are being forced to collect sensitive data that they arguably don't need to transact with a customer.

The same overhead and inefficiencies are present in other sectors where highly sensitive data may need to be verified, including in background checks for employment. The sharing economy, which relies heavily on trust and on the verification of identity and personal information, grew an average of 32.4% per annum from 2014 to 2016 and now includes 27 million adults in the U.S., demonstrating the growth and scale driving demand for identity verification services beyond the financial sector.

SUMMARY

The systems and methods discussed herein provide an improvement in controlling access to goods and services subject to restrictions, such as identity-based restrictions, while maintaining privacy and security of personal information of users or consumers.

In one aspect, the present disclosure is directed to a method for identity verification to provide access to restricted goods or services. The method includes receiving, by a first device from a second device operated on behalf of a user, a first request to purchase a restricted good or service. The method also includes transmitting, by the first device to the second device responsive to the first request, a second request comprising an identification of information of the user, and an identification of validation system. The method also includes receiving, by the first device from the second device responsive to the second request, the requested information of the user. The method also includes deriving, by the first device, an attestation key comprising a hash of the requested information of the user and the identification of the validation system. The method also includes determining, by the first device, that a transaction in a centralized or distributed ledger at an address corresponding to the attestation key is associated has a non-zero value. The method also includes, responsive to the determination that the transaction in the centralized or distributed ledger at the address corresponding to the attestation key is associated with the non-zero value, providing the restricted good or service to the user.

In some implementations, the first device comprises a vending machine holding an age-restricted product; the requested information of the user comprises an age or birthdate; and the method includes controlling a product dispensing system of the first device to release the age-restricted product.

In some implementations, the first device controls access to an age-restricted service; the requested information of the user comprises an age or birthdate; and the method includes controlling a product dispensing system of the first device to release a wearable indication indicating the user is eligible to receive the age-restricted service.

In some implementations, the method includes reading a visual code output by a display of the second device, by a camera of the first device, the visual code encoding the requested information of the user. In some implementations, the second request further comprises an identification of a plurality of validation systems; and the method includes receiving, by the first device from the second device responsive to the second request, a selection of one of the validation systems of the plurality of validation systems. In a further implementation, the method includes receiving a response comprising the attestation key, by the first device from the second device; and generating the attestation key further comprises extracting the attestation key from the response. In a still further implementation, the attestation key comprises a cryptographic one-way hash, such that the first device cannot recover the requested information of the user from the attestation key.

In some implementations, the request to purchase the restricted good or service further comprises an identification of a purchase eligibility. In some implementations, the method includes receiving, by the first device from a third device operated on behalf of a second user, a third request to purchase the restricted good or service; transmitting, by the first device to the third device responsive to the third request, a fourth request comprising an identification of information of the second user, and an identification of the validation system; receiving, by the first device from the third device responsive to the fourth request, the requested information of the second user; generating, by the first device, a second attestation key comprising a hash of the requested information of the second user and the identification of the validation system; determining, by the first device, that a transaction in a distributed ledger at an address corresponding to the second attestation key is associated with a zero value or that said address does not exist in the distributed ledger; and responsive to the determination that the transaction in the distributed ledger at the address corresponding to the second attestation key is associated with the zero value or that said address does not exist in the distributed ledger, preventing access to the restricted good or service by the second user.

In another aspect, the present disclosure is directed to a method for identity verification to provide access to restricted goods or services. The method includes providing, by a user via a first device to a second device, a first request to purchase a restricted good or service. The method also includes receiving, from the second device responsive to the first request, a second request comprising an identification of information of the user, and an identification of a validation system. The method also includes transmitting, by the user via the first device to the second device responsive to the second request, the requested information of the user, receipt of the requested information causing the second device to generate an attestation key comprising a hash of the requested information of the user and the identification of the validation system, and determine that a transaction in a distributed ledger at an address corresponding to the attestation key is associated with a non-zero value. The method also includes receiving the restricted good or service, by the user, access provided by the second device responsive to the determination that the transaction in the distributed ledger at the address corresponding to the attestation key is associated with the non-zero value.

In some implementations, the method includes transmitting a response comprising the attestation key, via the first device to the second device; the attestation key comprising a cryptographic one-way hash, such that the second device cannot recover the requested information of the user from the attestation key.

In another aspect, the present disclosure is directed to a system for identity verification to provide access to restricted goods or services. The system includes a first device, in communication with a second device operated on behalf of a user, the first device comprising a verification engine and an access controller. The verification engine is configured to: receive, from the second device, a first request to purchase a restricted good or service; transmit, to the second device responsive to the first request, a second request comprising an identification of information of the user, and an identification of a validation system; receive, from the second device responsive to the second request, the requested information of the user; generate an attestation key comprising a hash of the requested information of the user and the identification of the validation system; and determine that a transaction in a distributed ledger at an address corresponding to the attestation key is associated with a non-zero value. The access controller is configured to provide the restricted good or service to the user, responsive to the determination that the transaction in the distributed ledger at the address corresponding to the attestation key is associated with the non-zero value.

In some implementations, the first device comprises a vending machine holding an age-restricted product, and a product dispensing system; the requested information of the user comprises an age or birthdate; and the access controller is further configured to control the product dispensing system of the first device to release the age-restricted product.

In some implementations, the first device controls access to an age-restricted service and comprises a product dispensing system holding one or more wearable indicators; the requested information of the user comprises an age or birthdate; and the access controller is further configured to control the product dispensing system of the first device to release a wearable indication indicating the user is eligible to receive the age-restricted service.

In some implementations, the first device further comprises a camera, and wherein the verification engine is further configured to read a visual code output by a display of the second device, via the camera, the visual code encoding the requested information of the user. In some implementations, the second request further comprises an identification of a plurality of validation systems; and the verification engine is further configured to receive, from the second device responsive to the second request, a selection of one of the validation systems of the plurality of validation systems.

In some implementations, the verification engine is further configured to receive a response comprising the attestation key, from the second device; and wherein generating the attestation key further comprises extracting the attestation key from the response. In a further implementation, the attestation key comprises a cryptographic one-way hash, such that the first device cannot recover the requested information of the user from the attestation key.

In some implementations, the request to purchase the restricted good or service further comprises an identification of a purchase eligibility. In some implementations, the verification engine is further configured to: receive, from a third device operated on behalf of a second user, a third request to purchase the restricted good or service; transmit, to the third device responsive to the third request, a fourth request comprising an identification of information of the second user, and an identification of the validation system; receive, from the third device responsive to the fourth request, the requested information of the second user; generate a second attestation key comprising a hash of the requested information of the second user and the identification of the validation system; determine that a transaction in a distributed ledger at an address corresponding to the second attestation key is associated with a zero value or that said address does not exist in the distributed ledger; and responsive to the determination that the transaction in the distributed ledger at the address corresponding to the second attestation key is associated with the zero value or that said address does not exist in the distributed ledger, prevent access to the restricted good or service by the second user.

BRIEF DESCRIPTION OF THE DRAWINGS

The foregoing and other objects, aspects, features, and advantages of the disclosure will become more apparent and better understood by referring to the following description taken in conjunction with the accompanying drawings. FIGS. 1 through 9 describe implementations of a digital identity verification system, in which:

FIG. 1 shows a digital identity verification system from the viewpoints of a validator and requester, that individuals can use to have a fingerprint of their digital identity authenticated and stored on a blockchain and on their device, according to some implementations;

FIG. 2 shows a simplified diagram illustrating how a user, validator, requester, attestation blockchain, and marketplace blockchain interact in a token economy system for identity verification services, according to some implementations;

FIG. 3 shows a simplified block diagram of a system for attestations to be shared between service providers, according to some implementations;

FIG. 4A shows a method performed by a service provider A acting as a validator in the system for attestations, according to some implementations;

FIG. 5 shows an illustration of the system's goals, according to some implementations;

FIG. 7 illustrates sample levels of different validators, according to some implementations;

FIG. 8 illustrates the penalty for a flag as the level varies for different values of a system constant (a), according to some implementations; and FIG. 9 illustrates the required stake of a validator with a penalty of 100 tokens per flag who performs 10,000 attestations, according to some implementations.

FIGS. 10 through 12 describe an implementation of a payment platform configured to interact with an online identity verification system, in which:

FIG. 11 depicts an implementation of some of the architecture of a payment platform configured to interact with an identity platform used to determine eligibility for access to restricted goods and services using according to some embodiments; and FIG. 12 depicts a method for determining eligibility for access to restricted goods and services using according to some embodiments.

DETAILED DESCRIPTION

Figure 1:
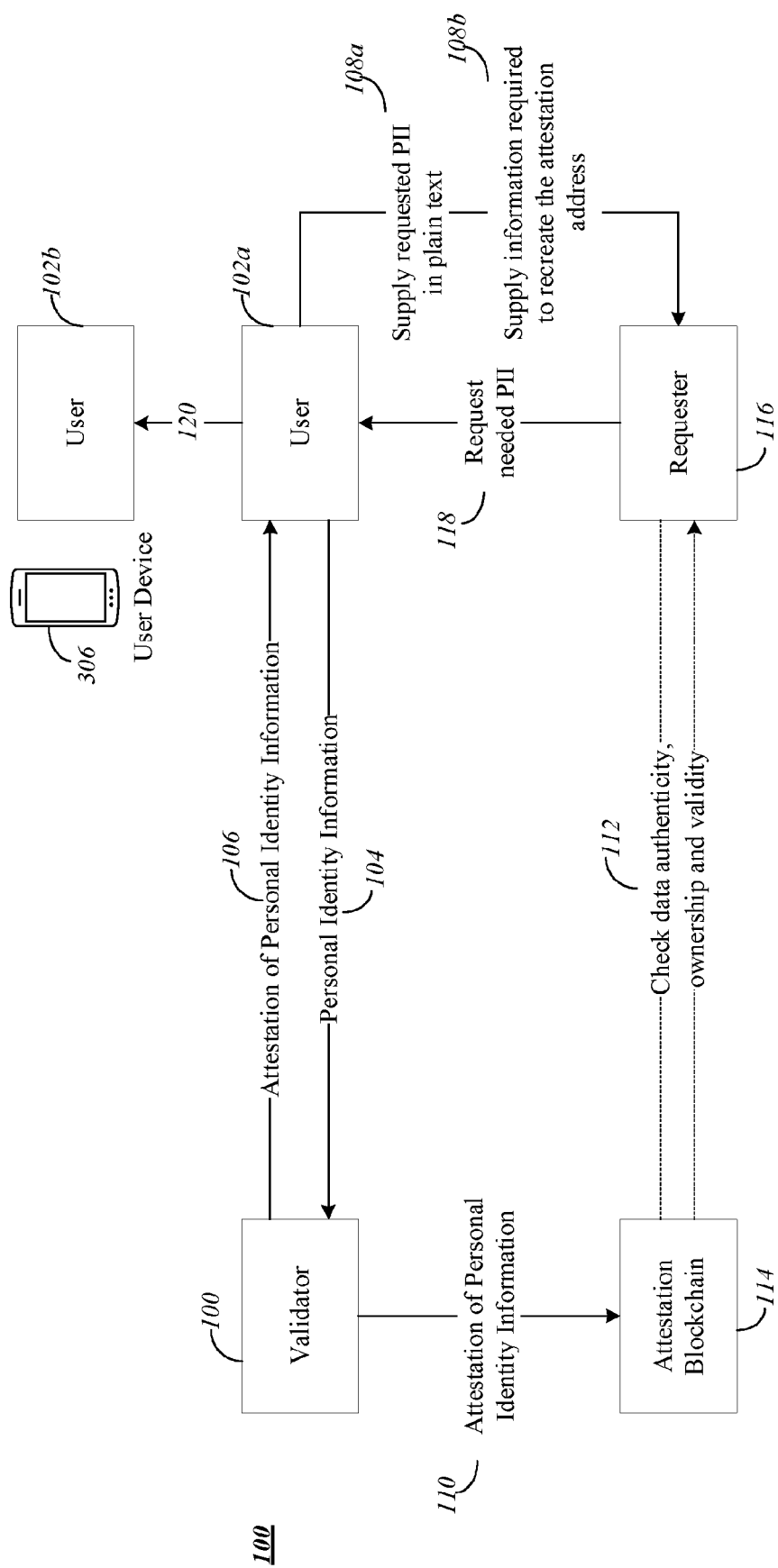

An identity verification system manages trusted digital identities and enables the use of those trusted digital identities to facilitate interactions between people in society. Digital identities include a collection of attributes and their values which can be used to identify the entities of a system and allow those entities to make identity claims. Identity management includes many aspects including creation of an identity, validation of an identity, storage of the identity, maintenance and updates to the identity, and protection of the identity from theft and unauthorized use. Use of identities allow a person or a computer to recognize other entities involved in an interaction and based on that to determine a role, scope of access, scope of authorization, and scope of actions that an entity can perform.

The identity verification industry has grown in response to the changing cultural, societal, and regulatory landscape concerning personal data, and a number of service providers now offer easy API access to multiple sources of consumer data for identity verification purposes. This largely ad hoc approach has resulted in an outdated, costly, and inefficient system.

For purposes of reading the description of the various embodiments below, the following descriptions of the sections of the specifications and their respective contents may be helpful:

Section A describes a network environment and computing environment which may be useful for enabling an identity management marketplace.

Section B describes a network environment and computing environment which may be useful for practicing embodiments described herein.

Section C describes embodiments of systems and methods useful for determining the eligibility of users for access to restricted goods and services.

Before discussing specific details of implementations of the systems and methods, it may be helpful to briefly review some terminology that may be used in explaining related concepts and technologies.

The term "user" can be generically applied to an individual, a group of individuals, an organization, or any other entity that has information associated with it. The term "requester" can be generically applied to any individual, organization, or other entity that interacts with a user and as part of an interaction with the user needs to know information related to the user with a high confidence that the information is accurate and is associated with the user. For example, a "requester" may be a merchant, service provider, or any other entity that controls access to goods, services, locations (including virtual locations such as websites or web applications); may be an employer or potential employer seeking to verify employee information; may be a governmental entity seeking to verify information of a user; or any other such entity. The term "validator" can be generically applied to any individual, organization, or other entity that interacts with a user and with one or more sources of known accurate information for the purpose of validating that information provided to the validator is factually accurate, currently relevant, and associated with the user. A validator may perform several steps in this validation process. If the validator has determined with a given confidence level that the information associated with a user is factually accurate, currently relevant, and associated with the user, then the validator may create an attestation and may record this attestation on a centralized or distributed ledger. In general, a validator is said to "attest" to information associated with a user when the user's information is validated, and an attestation is created. For example, a validator may be a bank or credit bureau or agency, a governmental agency, a third-party entity responsible for verifying and attesting to user information, or any other such entity. In general, the term "attestation" may be used to refer to any form of authenticated information associated with a user, i.e. information that has been attested to. An attestation may be recorded on, or can be referenced in, a centralized or distributed ledger, such as a blockchain based ledger. For example, an attestation may refer to a transaction sent to a blockchain address that is derived from authenticated information associated with a user. As discussed below, the attestation may be correct or incorrect; in other words, in many implementations, the attestation may reflect the validator's belief that the user information is authentic, but this belief may be incorrect and may, in some implementations, be associated with a confidence level as to its correctness. In some embodiments, an "attestation address" may refer to an address in a centralized or distributed ledger at which an attestation transaction is recorded. The attestation address may be derived from the user information being attested to one or more public keys. For example, in some implementations, an attestation address may be created by combining a hash of a user's information with a public key of the user creating an attest key, and the combining the attest key with a public key of the validator that created the attestation, and the public key of a digital wallet associated with the user, using an M of N multisig protocol. The resulting string may be used as an index within a distributed or centralized ledger, sometimes referred to as a "wallet" address or by similar terms. An attestation transaction may be recorded in association with the attestation address, thus allowing others (e.g. requesters or other entities) to look up the attestation transaction in the ledger by re-calculating the attestation address from the user information and any public keys utilized. Accordingly, the requester may not be given the address directly, nor does the user even need to remember the address in many implementations; instead, simply providing the information to be verified in plain text along with all the other information needed to recreate the root hash, and the public keys, enables the requester to derive the attestation address and determine whether a non-zero transaction has been recorded at that address. In some examples, an attestation of a user's information may be recorded on a centralized or distributed ledger by associating some value with an attestation address that was derived from the attestation of the user's information. In some embodiments, an attestation transaction refers to the process of spending cryptocurrency to an attestation address on a blockchain. For example, in some implementations, a value or token or currency amount may be added to a "wallet" at the attestation address within the ledger. A requester may subsequently receive the user information, recalculate the attestation address, and determine whether the wallet contains or is associated with the value or token or currency amount. If so, the attestation transaction has been recorded, and the requester may be confident that the validator has validated the user information and not revoked the validation (e.g. by subsequently subtracting the value or token or currency amount, such that the wallet is empty or the attestation address is associated with a zero value).

A. Computing and Network Environment for Identity Management Marketplace

In a general overview FIG. 1 is an illustration of an identity validation system 100, including users 102a and 102b, requester 116, validator 100, and attestation blockchain 114.

A blockchain, which is a peer-to-peer network also known as a distributed ledger, allows records within the ledger to be held securely and yet be openly authenticated, referenced and documented so that data can be trusted as reliable. A blockchain represents an archive of data and transactions that are performed in a data processing system.

A blockchain enables peer-to-peer online transactions of information with overall consensus without the need for a trusted intermediary. This was achieved by contriving a system in which it is difficult (from the standpoint of computational resources) to add transactions to the blockchain, but easy for anyone to check whether transactions are valid. The difficulty means that there is a cost involved in attempting to process transactions, and rewards for doing so legitimately in the form of new currency or transaction fees. Fraudulent transactions are quickly identified and discarded from the blockchain. Attempting to add a fraudulent transaction is costly, entails foregoing the financial incentives for acting honestly, and is highly unlikely to succeed because no single party in the overall network has more than a small proportion of the overall 'authority' to validate transactions. In practice, it is simpler and more profitable to act honestly. Because blockchains are typically maintained by a large network of participants, no one actor can easily gain enough influence to submit a fraudulent transaction or successfully alter recorded data (although possible in theory with enough resources, it would be prohibitively expensive in practice for large blockchain systems). Any change that a party attempts to make to the blockchain is recognized and rejected by the majority. Everything that takes place on the blockchain is visible to anyone. It is possible to see everything that has ever been recorded on the blockchain.

Blockchain addresses are strings of alphanumeric characters that cannot intrinsically be associated with a specific individual and may be randomly selected or generated in many implementations. In these legacy systems, while it is easy for the owner to prove they control an address if they wish, and it is often possible to build up a picture of transaction relationships due to the transparent nature of the blockchain, the address itself does not contain the owner's PII.

In many implementations of blockchain systems, the data stored in a distributed ledger are all public and therefore not vulnerable to theft. Data integrity is protected and therefore not vulnerable to illegal or accidental modifications, and the data is time-stamped so that its provenance can be validated. Data is sequenced in a cryptographic time chain so illegal insertions of false data is may be readily detected due to signature or hash mismatches. These ledgers operate without the need for a trusted third-party and without the need to trust any component of the system overall. The blockchain is policed by every member of the network and its integrity checked and agreed by the network on an ongoing basis. Because of this immutability, a transaction that has been accepted into the network cannot be reversed. With no trusted intermediary to act on behalf of the user or control the movement of their funds, blockchain transactions are immune to chargebacks and are like paying in physical cash, but online.

Referring to FIG. 1 in more detail, FIG. 1 shows a digital identity system that individuals can use to have their digital identity authenticated and recorded on an attestation blockchain 114 and on their device 306. The system comprises one or more users such as users 102a and 102b, one or more requesters 116, one or more validators 100, and attestation blockchain 114. User 102a may be any entity that has information associated with it e.g. a human, a robot, a business etc. Requester 116 is an individual or a business or a service provider that user 102a wants to have an interaction with. In embodiments, validator 100 is an identity verification provider. In some examples, requester 116 may also be a validator 100, and validator 100 may also be a requester 116. In some embodiments, a service provider may be a validator 100 of user 102a PII in one interaction, and a requester 116 of validated user 102a's PII in another interaction. Attestation blockchain 114 can be any distributed ledger platform. In some embodiments, attestation blockchain 114 can be the ETHEREUM blockchain (Ethereum Foundation, Zug, Switzerland), HYPERLEDGER (Linux Foundation, San Francisco, California), R3CORDA (R3, New York City, New York), HASHGRAPH (Hedera Hashgraph, Richardson, Texas) and the BITCOIN blockchain. It is understood that any distributed ledger that is presently in use or is developed in the future may be used as a platform for the systems and methods discussed herein.

Bitcoin is a peer-to-peer currency that was launched in January of 2009 as blockchain's first application. Bitcoin's innovation was solving the so-called 'double-spend' problem in online financial transfers: the issue that data is readily copied, and that it is therefore impossible to prevent the same funds from being sent to more than one recipient unless there is a trusted intermediary to keep accounts. This centralized model was used by all banks and payment processor who dealt with electronic funds transfers. Such a centralized approach always involves trust, because there must be an authority whose job it is to organize the transfer of money from one account to another. In the physical world, money is handed over directly from one person to another person. Online, however, there must be intermediaries. Rather than transferring funds from their account directly to the recipient, the user instructs the intermediary to move funds on the user's behalf.

This centralized system has a number of potential drawbacks. The trusted intermediary may prove untrustworthy, they have control over the user's funds, and they can ultimately block or reverse transactions. The centralized nature of online banking and other online money transfer protocols leaves users vulnerable to intervention by these trusted intermediaries and comes with security risks, because there is always a single point of failure. Centralized databases can be hacked, and their administrators compromised or coerced by a range of actors.

The Bitcoin blockchain was designed for peer-to-peer online transfers of value, effectively acting as digital cash. It achieves this not by moving money from one address to another, but by maintaining and updating the ledger to reflect how much money is registered to each address. The same approach to recording data transparently, securely and immutably by consensus of the entire network can be extended to many other applications (since the financial value in the Bitcoin network is simply information about who owns what). For example, messages can be stored on the blockchain, either encrypted or in plain text. Additionally, secondary tokens representing assets, such as shares in a business, securities, commodities, and other currencies, can be secured on the blockchain.

In step 104, user 102a provides personal identifiable information (PII) to validator 100 along with user 102a's public key. In some embodiments, the user PII is organized into small units. Organizing the user information in small units enables the user to only share the information with a requester 116 that they want to, at the granularity of the small units, because the small units of information can be verified independently allowing the user to only share the information that is requested. In traditional methods, for example to prove their age, user 102a would have to share a driver's license or passport for example, which gives away a lot of information that user 102a may not wish to share if all user 102a is trying to do is prove their age.

In some examples, the way the PII is organized into small units is determined by validator 100. In examples, validator 100 organizes user PII into small units that are likely to be requested independently. In some embodiments, the organization of PII into small units is determined based on a standardized format. As an example, if user 102a's PII consists of first name, last name, house number, street address, city, state, country, post/zip code, day of birth, month of birth, year of birth, and country of citizenship, validator 100 may organize this PII into smaller units as follows:

a. Personal: First name, last name
    b. Address: House number, street address
    c. Address: City
    d. Address: State
    e. Address: Country
    f. Address: Post/zip code
    g. Personal: Day, month, year of birth
    h. Personal: Citizenship Validator 100 authenticates user 102a's PII and attests to the validity and ownership of the PII. For PII that has been authenticated, in embodiments, each of the small units of user 102a PII are combined with a different random number which may be referred to as "salt" in order to randomize each small unit of PII. Each small unit of randomized PII is then hashed, independently from other randomized small units of PII. Each hashed randomized small unit of user 102a PII may be referred to as a leaf and the leaves are organized as a Merkle Tree.

A Merkle Tree is a method used in cryptography that allows a large body of information to be verified for accuracy extremely quickly and efficiently. Merkle Trees, by design, always group all of the hashes into pairs. If there is an odd number of hashes, the last hash is copied and then paired with itself. Then, those hash pairs go through a hashing function or hashing algorithm, that combines a pair of hashes into one hash. This process continues until there is only one input remaining. In the case of attestation of a user's PII, each leaf which is a hashed randomization of a small unit of user PII, can be hashed together with another leaf to form a node, and nodes can be hashed together until only one hash remains, which is called the root hash. The root hash therefore is made up of many other hashes, each of which represents one small unit of user PII, and the root hash itself is derived from all of the user's PII. Organizing an attestation of user 102a PII in a Merkle Tree made up of multiple leaves allows user 102a to only share one part (one leaf) of their PII with requester 116, and requester 116 can verify that one part of user PII against the attestation that is derived from all of user 102a's PII. If one unit of user PII changes, it will change the leaf which is the hash of that small unit of user PII, which will also change the root hash.

Validator 100 combines the root hash with the user's public key, creating a public attest key. The public attest key is therefore derived from all of user 102a's PII. In embodiments, validator 100 combines the public attest key with the validator's public key and a public key of a digital wallet creating an attestation address, which is an address on attestation blockchain 114. In step 110, validator 100 creates an attestation of user 102a's personal identity information by spending a small amount of cryptocurrency to the attestation address on attestation blockchain 114. In some embodiments, if attestation blockchain 114 is the Bitcoin blockchain, the attestation address will appear in the UTXO ledger or database as there is an unspent transaction at the attestation address.

In step 106, validator 100 sends to user 102a information which is required in order to recreate any part of the attestation address. In examples in step 106 validator 100 sends one of more of the following information to user 102a after attesting to user 102a's PII, for example for 102a to store on user 102a's device 306.

1. The small units of user 102a PII in plain text form.
2. The "salt" associated with each small unit of user 102a PII, i.e. that was used to randomize the small unit of user 102a PII.
3. The hashing algorithm or identification of the hashing algorithm that was used.
4. Each leaf hash in the Merkle Tree, which are hashes of each of the randomized small units of user 102a PII.
5. All assembled node hashes that are needed to travers to the root hash.
6. The root hash.
7. The attest key.
8. All public keys (for example user 102a's public key, validator 100's public key, digital wallet public key) that were used when creating the attestation address.
9. The attestation address.

In some embodiments, information sent by validator 100 to user 102a may be stored on user 102a's device 306 using high-level encryption and/or biometric locks, such as fingerprint identification.

User 102a may initiate an interaction with requester 116. To proceed with the interaction, in step 118, requester 116 may request PII from user 102a. In examples, requester 116 may indicate to user 102a one or more validators 100 that are acceptable to requester 116. In some examples, validator 100 may provide to user 102a a white list of acceptable validators 100. Validator 100 may instead provide to user 102a characteristics that an acceptable validator 100 must have, for example a minimum accuracy rate, a maximum cost per attestation, and so on. In step 108a, user 102a may supply one of the small units of user 102a PII that comprises the requested PII to requester 116 in plain text format. In step 108b, user 102a may supply information to enable requester 116 to derive the attestation address on attestation blockchain 114 for user 102a's PII. In examples, in step 108b, user 102a may send the "salt" used by validator 100 to randomize the small unit of user 102a PII that contains the requested PII. In some embodiments, in step 108b, user 102a may send to requester 116 the hash function used by validator 100 to create a leaf of the randomized small unit of information. In some embodiments, in step 108b, user 102a may provide all the leaf hashes of all the small units of user 102a PII. In some embodiments, in step 108b, user 102a may provide all assembled hashes that are needed to traverse to the root hash. In some embodiments, user 102a may provide the root hash. In some embodiments, in step 108b, user 102a may provide user 102a's public key, validator 100's public key, and digital wallet provider's public key. In some embodiments, in step 108b, user 102a may provide the derived attest key. In some embodiments, user 102a may provide the attestation address on blockchain 114 derived from all of user 102a's PII.

In step 112, requester 116 may use the requested PII from user 102a together with other information supplied by user 102a to verify the requested PII from 102a. In embodiments, requester 116 may use the plain text of the small unit of user PII sent by user 102a, the salt value associated with that small unit of user PII, and the specified hashing algorithm to recreate the leaf. Requester 116 may compare the calculated leaf to the leaves sent by user 102a in step 108b to see if there is a match. In examples, if there is not a match between the calculated leaf and any of the other leaves sent from user 102a to requester 116 in step 108b, then requester does not provide the requested good or service to user 102a.

In examples, in step 112, to verify the authenticity, ownership and validity of the requested user 102a PII, requester 116 may utilize some of the same steps validator 100 employed when creating the attestation. To recreate the Merkle Tree of user 102a's PII, requester 116 may recalculate the one or more leaf hashes of small units of user 102a's PII using salt values associated with the small units of user PII. Requester 116 may use the recalculated leaf hashes with other information sent by user 102a in step 108b to recreate the one or more attestation addresses. In some embodiments, requester 116 checks at each step of the calculation to determine whether the calculated output matches any of the information sent by 102a in step 108b. For example, requester 116 may compare the calculated root hash to the root hash sent by user 102a in step 108b. In examples, requester 116 may compare the calculated attest key to the attest key sent by user 102a in step 108b. In examples, requester 116 may compare the calculated attestation address to the attestation address sent by user 102a in step 108b. In examples, requester 116 may check the attestation address on attestation blockchain 114 to see if there is a non-zero transaction at that address. If every step of this process matches the sent values, and if there is a non-zero transaction at the attestation address, then requester 116 may have confidence that the requested information (for user 102a to be eligible to access the good or service) is accurate, current, and associated with user 102a.

In some embodiments, for the user to send requester 116 the PII needed to access the good or service, user 102a must have some PII that was attested to by one validator 100 and some PII that was attested to by another validator 100. In some embodiments, requester 116 may check the PII authenticity, ownership, and validity of user 102a PII by calculating the one or more associated hashes and creating the one or more attestation addresses, one for each validator 100, using at least information about the one or more validators 100 that attested to the PII embodied in the one or more hashes, and checking that there is are non-zero values at these one or more attestation addresses. For example, the requester may receive the PII from the user 102a and may calculate an attestation address based on the root hash. The requester may then access the attestation ledger (for example, attestation blockchain 114) at the calculated attestation address and determine whether that address exists and whether it contains a non-zero transaction value. If no transactions have ever been associated with the calculated attestation address, requester 116 may not trust the PII sent by user 102a as accurate, as the PII has not been validated by that validator 100. If the attestation address exists, with a non-zero transaction value (e.g. a cryptocurrency dust value or a minimum value needed to execute a transaction, or a minimum token value or some other non-zero value), then the PII has been validated and is current and requester may trust the PII sent by the user. If the attestation address exists, but has a zero value—e.g. if a transaction has been recorded "spending" the currency or token associated with that attestation address—then the PII has been previously validated, but its validity may have been revoked (e.g. responsive to the PII changing, such as a change of a home address of the user or responsive to the PII being flagged or identified as invalid). Thus, requester 116, with information and PII provided by user 102a, may verify that the PII has been validated and recorded, and whether the validation is active or inactive.

In examples, if requestor 116 is satisfied with the PII authenticity, ownership, and validity based on the one or more hashes, requestor 116 may purchase the one or more attestations from the one or more validators 100. Smart contracts may be used to put payment for attestations into escrow. User 102a may supply PII, for example in plain text form, to requester 116. In some examples, user 102a may then initiate the release the payment from escrow. If, for example as a result of the above method, requester 116 is able to successfully verify user 102a's PII, then requester 116 may proceed with the original interaction that user 102a initiated. In some examples, the escrow payment may be released after requester 116 determines that the PII has been validated.

Smart contracts—which are also known as self-executing contracts, blockchain contracts, or digital contracts—are stored and replicated on a centralized or distributed ledger and supervised by the network of computers that run the centralized or distributed ledger. In this format, contracts are converted to computer code that can execute a function when invoked. A smart contract between parties is written as code into the blockchain. The parties involved are anonymous, but the contract is in the public ledger. A triggering event takes place and the contract executes itself according to the coded terms. In contrast to the Bitcoin blockchain, which is designed to execute the specific function of transferring value in BTC, a smart contract platform is a general purpose blockchain. Examples of smart contract platforms include ETHEREUM (Ethereum Foundation, Zug, Switzerland), ROOTSTOCK (RSK) (IOV Labs, Buenos Aires, Argentina), EOS (Block.one, Hong Kong, China), NEO (NEO Team, Shanghai, China), and DFINITY (DFINITY, Palo Alto, United States). Blockchains require that transaction fees are paid in the native currency of the blockchain, for example Bitcoin ('BTC') for the Bitcoin blockchain, and ether ('ETH') for the Ethereum blockchain. Fees for executing transactions on the Ethereum blockchain are related to computational complexity, bandwidth, and storage needs (in a system known as "gas"). Gas units each have a price that can be specified in a transaction. Smart contract platforms allow for the creation of separate tokens that are distinct from the native currency. As noted previously, these tokens are digital assets, cryptographically secured upon the blockchain, which can represent whatever the issuer wants and is prepared to back (if necessary), and which can play whatever role in the system that its rule-set determines. These tokens can be transferred on a peer-to-peer basis for a transaction fee, just like native currency (e.g. ETH). They can be incorporated into smart contracts as an integral part of the system.

Any member of the system can be an incentivizing party to introduce new users to the system. For example, in step 120, user 102a may introduce new user 102b to the system. In some examples, introduction to new users may be enabled by an incentivization mechanism with tokens that participants collectively provide to accelerate the overall adoption of the system. In some examples, tokens may be paid to users who refer other uses to a validator. In some examples, tokens may be paid to users by any other party in the system. Tokens may be paid to a user in order to encourage the user to use applications or services which add other participants to the system. Validator 100 may be an individual, a group of individuals, an entity or service provider that is trusted to validate a user's PII.

Examples of validators 100 include but are not limited to financial institutions such as banks, government entities, other companies such as utility providers, and verification providers, such as biometrics, network solutions, and device identification providers. User 102a's PII may include elements such as name, phone number, e-mail address, address (street, city, country, post or zip code), number of children, SSN or FEIN or other government identification number, date of birth, employer or advisory board participation, number of reporting employees or coworkers, and any other information that is personal or tied to a specific user.

In some embodiments, the subdivision of user 102a's PII may be structured in a hierarchy. In some embodiments, the subdivision of user 102a's PII may follow a defined model. In some embodiments, the subdivision of user 102a's PII may follow an industry standard for a container or framework for personal data. In some embodiments, the negotiation of the subdivision of user 102a PII may be dynamic between participants in the system.

In some embodiments, a cryptographic hash function such as SHA-2 (National Security Agency, United States) is used for the hashing. A benefit of using a Merkle Tree is that one leaf of the Merkle Tree can be verified independent of the rest of the tree. This is advantageous in an identity verification system since user PII can be split up into smaller data blocks containing a subset of the PII, such that a user 102a may share only the PII that the requester 116 has asked for, without sharing PII that is not needed or was not requested.

If user 102a wants to update a portion of their PII, or add PII to the attestation, they can send the updated or new PII to validator 100. Validator 100 will recalculate impacted leaves, and/or calculated new leaves. Validator 100 will then calculate a new root hash, attest key and attestation address. Validator 100 will then spend the cryptocurrency from the previous attestation address for that user 102a's PII to the newly calculated attestation address for that user 102a's PII.

The original attestation remains in the immutable ledger but may have no tokens or currency associated with the attestation address, indicating that the attestation is no longer valid.

The root hash is converted to an "attest key" using the additive property of elliptic curve cryptography ('ECC'):

$$k_{pub}+h=k_{attest}$$

where $k_{pub}$ is the public key of the user, h is the root hash, $k_{attest}$ is the attest key, and '+' represents addition in the ECC sense. The attest key is combined with the public key of validator 100 and one or more cosigner's public keys, for example the public key for a digital wallet provider, to create an attestation address which is a blockchain address. This blockchain address makes it unfeasible to determine the user 102a and validator 100 associated with the blockchain address, which is essential to protecting the privacy of the participants. If user 102a does not wish to reveal all of the underlying PIT that was attested to, portions of the hash tree can selectively be revealed, with only hashes provided for any elements user 102a prefers not to reveal.

In some embodiments, a user application on user device 306 can facilitate payment for goods and services and can also parse identity information and manage rewards and incentives. In examples, the user application is configured to enable a user to pass money to other users of the applications, and to enable a user to pay for goods and services. In some embodiments, a user may send a QR code via the user application on the user device to a service provider or a device of a service provider (for example, a vending machine), the service provider will determine whether the user meets the user requirements necessary to purchase the good or service, and if the user meetings the user requirements, the service provider will process payment from the user via the user application and will provide the user with the good or service. In some examples, the service provider performs this functionality using a service provider application that is configured to process payments for good or services, verify identity requirements for goods or services, and deliver goods or services to a user.

In some embodiments, verification of user identity or other user information is performed locally at the service provider device. In examples, verification of user identity or other user information is performed by the service provide using a cloud-based service or a remote server. In some examples, the service provider enables the producers of the products or services to offer the purchaser of the goods or services rewards. In embodiments, payment applications on user devices enables users to give, receive, and share rewards between users.

In some embodiments, user 102a may scan proof of identity at the service provider, e.g. at the service provider device, for example at the vending machine. The service provider device may scan the user proof of identity and validate the proof of identity, for example the service provider device becomes a validator. In examples, the service provider device may scan the user proof of identity and verify the proof of identity, for example using the technologies described in this disclosure, or using any centralized or distributed ledger solution that provides attestation of user information, for example user identity. In examples, the service provider device uses Ethereum identity contracts to validate and/or verify user identity.

Using a smart contract platform, the system would store the attestation address or the root hash at a discoverable location. In this embodiment, revocation status may not be represented by unspent currency, but rather modeled as a parameter of the attestation. A participant in the system may reproduce the root hash from the original PII or from partial information of the original PII if user 102a provides the remaining information necessary to construct the Merkle Tree and generate the root hash. This allows user 102a to share PII with another participant in the system and prove that it is the same PII that was previously attested to by validator 100.

A requester 116 is an individual or a business or a service provider that a user 102a wants to have an interaction with. User 102a may try to initiate an interaction with requester 116. For example, requester 116 may be a car rental agency and user 102a may request to rent a car. To proceed with the interaction, in step 118, requester 116 may request PII from user 102a. Requester 116 may request user 102a's first and last name, date of birth, credit card number, credit card expiration date, credit card security number, and billing address of user 102a's credit card. In some examples, requester 116 may request additional information, such as an accident history of user 102a, or insurance claim information for user 102a. In some embodiments, requester 116 may provide to user 102a a list of validators that requester 116 trusts.

A validator 100 is a trustworthy identity verification provider. Validator 100 may be an individual, a group of individuals, an entity or service provider that is trusted to validate a user's PII. Examples of validators 100 include but are not limited to financial institutions such as banks, government entities, companies such as utility providers, and other verification providers, such as biometrics, network solutions, and device identification. The PII may be encrypted locally on user 102a's device 306 before it is stored, for example using biometric data or locks such that only the user may be able to access the plain text PII. The attestation of user 102a' PII from validator 100 may be stored on the user's device. Other information about validator 100 may additionally be stored on the user's device. In some embodiments, information such as name, address, identification number (SSN or FEIN for example) and contact details of validator 100 may be stored on the user's device 306. In some embodiments, a trust level or reputation of the validator is stored on the user's device 306. Properties of a validator 100 may be attested to and the attestation recorded on attestation blockchain 114.

Figure 2:
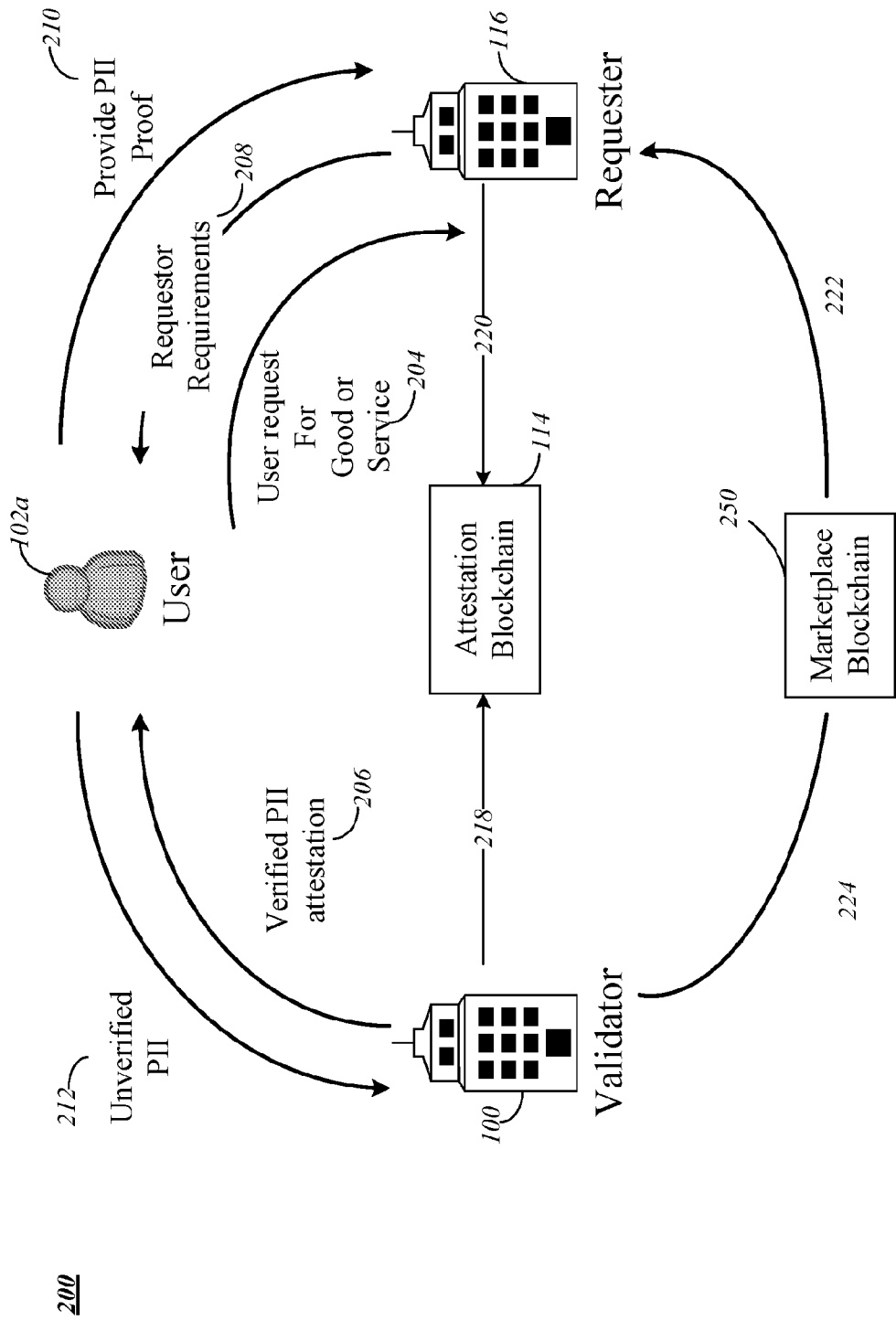

In a brief description, FIG. 2 is an illustration of the token economy system including user 102a, requester 116, validator 100, attestation blockchain 114, and marketplace blockchain 250.

Describing FIG. 2 in more detail, the token economy system ensures that user 102a remains in control of their PII, as user 102a must give consent before any identity verification transaction between validator 100 and requester 116 can be completed. In some embodiments, in step 204, user 102a approaches requester for an interaction. In examples, the interaction comprises requesting a service, purchasing a good, voting, trading of securities, or any other interaction. In step 208, requester 116 sends user 102a a list of requirements necessary to perform the interaction. In some embodiments, requester 116 sends user 102a a list of validators 110 acceptable to requester 116, and the user PII that is required. If user 102a has the required PII attested to by a validator 100 that requester 116 has indicated is acceptable, requester 116 and validator 100 agree on a price for the attested PII. In some embodiments, validator 100 sets a price for the attested PII. In some embodiments, requester 116 offers a price for the attested PII. In some examples, the set or offered price for the attested PII may be proportional to the validator's accuracy percentage or level. Once the price has been agreed in step 222, in some embodiments requester 116 places tokens into an escrow smart contract within marketplace blockchain 250. In step 210, user 102a sends the requested PII to requester 116 in readable form, for example plain text form and sends other information required for requester 116 to be able to verify the attestation on attestation blockchain 114.

In some embodiments, user 102a does not have a suitable attestation. In one example, some of user 102a's PII that requester 116 has required has been attested to by a validator that requester 116 accepts, but some of user 102a's PII that requester 116 has required has not been attested to by a validator that requester 116 accepts. In some examples, all of user 102a's PII that requester 116 has required has been attested to, but none of user 102a's PII has been attested to by a validator that requester 116 accepts. In some examples, none of user 102a's PII that requester 116 has required has been attested to by any validator. In some embodiments where user 102a does not have a suitable attestation of the PII that requester 116 has required, user 102a may approach a validator that is accepted by requester 116 with the required unvalidated PII. In step 212, user 102a sends unvalidated PII to validator 100, wherein validator 100 is an accepted validator for requester 116. Once validator 100 is satisfied with the authenticity of user 102a's PII, it will attest to the accuracy and provenance of user 102a's PII by creating an attestation of user 102a's PII as previously described. In step 206, validator 100 sends the validated PII attestation and associated information to user 102a as previously described. In some embodiments, the original PII, the attestation, and the associated information is stored on the user's mobile device 306 in an encrypted form. Encryption on the mobile device is an independent layer of security that protects against information being compromised if user 102a's device 306 is lost or stolen.

In step 220, requester 116 inspects attestation blockchain 114 to see if the recreated attestation is valid and if the attestation has not been revoked. If the attestation is valid and has not been revoked, then the PII from user 102a is verified, and the requester proceeds with the interaction. In step 224, a smart contract running on marketplace blockchain 250 causes the tokens from requester 116 that are held in escrow to be released. In some examples the smart contract running on marketplace blockchain 250 causes the tokens from requester 116 that are held in escrow to be released responsive to requester 116 verifying the PII of user 102a. In some embodiments the smart contract running on marketplace blockchain 250 causes the tokens from requester 116 that are held in escrow to be released irrespective of whether requester 116 proceeds with the interaction with user 102a. In some embodiments, the smart contract running on marketplace blockchain 250 causes the tokens from requester 116 that are held in escrow to be released as soon as user 102a has transmitted the PII, and the information required to recreate the attestation address to requester 116. In some embodiments, some tokens from requester 116 that are held in escrow are released to validator 100, user 102a, or the system operator. In some embodiments, user 102a receives a predetermined proportion of the tokens from requester 116 that are released from escrow, and validator 100 receives all or some of the remainder. In some embodiments, all of the tokens in escrow may be released to either validator 100 or user 102a.

Figure 3:
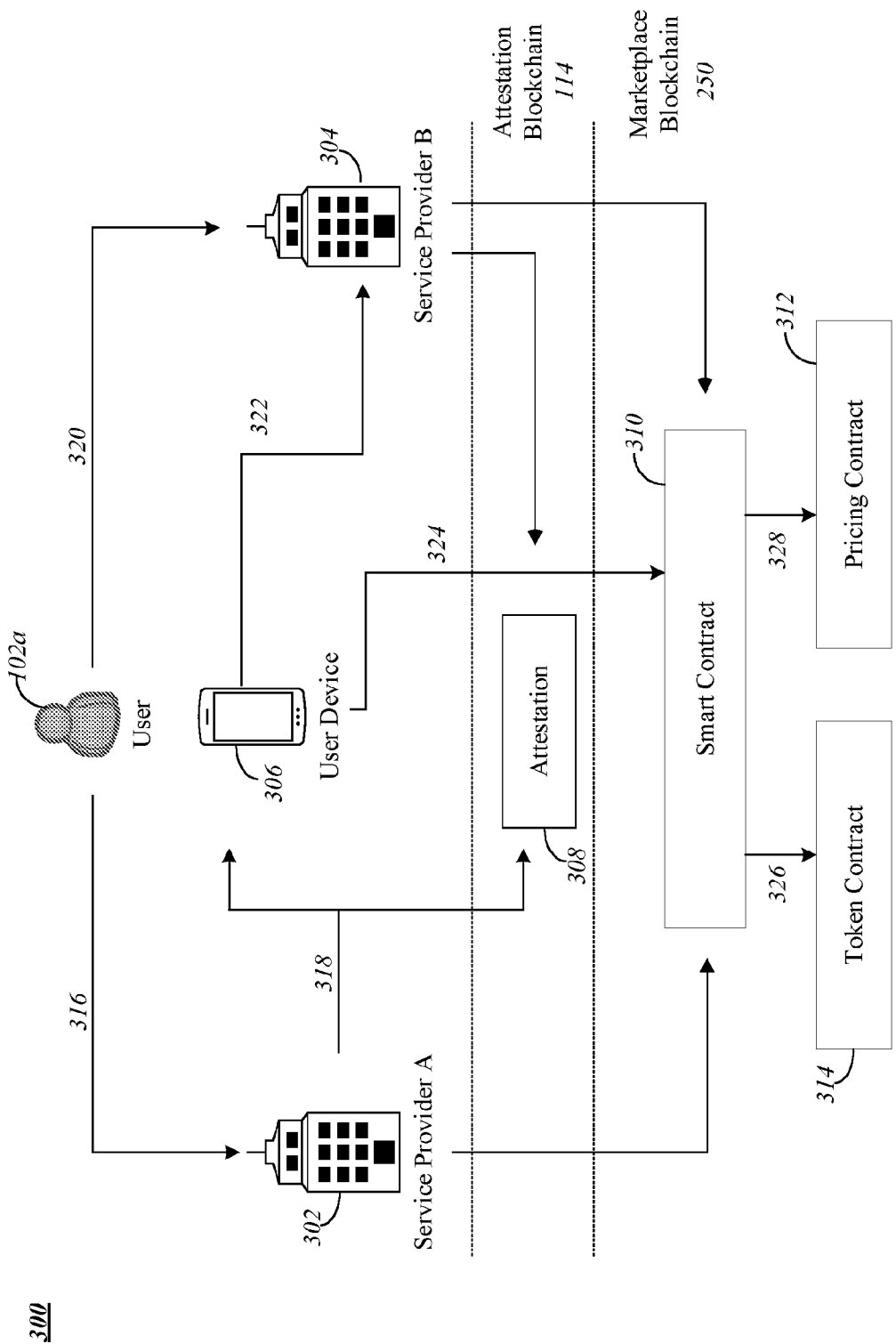

FIG. 3 shows a simplified block diagram of a system 300 for attestations to be shared between identity verification service providers. In a general overview, in some examples, system 300 includes one or more users 102a. User 102a may have a device 306. In some examples, system 300 includes one or more service providers 302 and 304. In some examples, system 300 includes an attestation 308 which may be recorded on attestation blockchain 114. In some embodiments, system 300 may utilize marketplace blockchain 250. One or more smart contracts 310 may be stored on marketplace blockchain 250. In some embodiments, system 300 may include token contract 314 and in some embodiments, system 300 may include pricing contract 312. A token contract 314 (which may read or write to a token leger) may indicate who owns how many tokens. An escrow smart contract may encode the transaction of tokens between requester 116 and other system participants, such as user 102a and validator 100. A pricing contract may contain the listing price that validator 100 asks for a one-time transmission of certain PII between user 102a and requester 116. In some embodiments, an ontology smart contract may define what kind of predefined PII are traded in the system. In some examples, an identity verification registry 500 may define what validators are registered in the system as well as a digital "fingerprint" of their associated metadata, public key, etc.

Referring to FIG. 3 in more detail, service provider A 302 and service provider B 304 may take on different roles in system 300. The set of roles that service provider A 302 and service provider B 304 may take on are the same, and in the detailed discussion of these roles, the term service provider will be used generally to refer to any service provider in system 300, including service provider A 302 and service provider B 304. Service provider in system 300 may take on the role of a user in the system. When acting as requester 116 in the system, a service provider may desire to have some information about another service provider attested to by validator 100 in system 300, for example so that a different service provider in system 300 may be able to verify aspects of the identity of a service provider. When acting as a validator in the system, a service provider may be trusted by user 102a and/or requester 116 to validate the authenticity and provenance of PII. When acting as a requester 116 in system 300, a service provider may have a requirement to verify PII from user in system 300, may make a request to the user for PII, and may make a request to a trusted validator 100 in the system to use an existing attestation of the PII to verify the user. System 300 may have any number of service providers, and any of the service providers in system 300 make take on any of the roles described. At different times, service provider A may act like a user, a validator, or a requester.

In some examples, user 102a in system 300 may have control over the user's device 306. In some embodiments, user device 306 may be a personal computer or a laptop computer. In some embodiments, user device 306 may be a portable computing device such as a tablet or a smartphone. User device 306 may be a shared device on which user 102a has a user profile which is accessible to user 102a by entering a password or pin or other code which is private and known only to user 102a or by using biometric information. In some examples, user device 306 may be a smart watch which may have direct connectivity to a network or may have connectivity to a network through a separate device controlled by user 102a, such as a smartphone. User device 306 may be a connected car. In general, user device 306 may be any connected device for which all or a partition of the device is solely under control of user 102a. In some embodiments, an identity verification application or any other application, may execute on user device 306, the identity verification application configured to execute instructions that enable functionality of system 300.

Attestation 308 represents a transaction on attestation blockchain 114 at an attestation address that is derived from PII of user 102a. Attestation 308 is created by validator 100 when the validator has checked and validated the authenticity and provenance of the PII and is assured of its accuracy. In some examples the verification or validation level of the validator, and details related to the validator's process of verification or validation of information may be sent to user 102a along with other information related to the attestation, for example any applicable standards that have been used to structure, organize, or encode PII. A verification or validation level can be derived from the validator's accuracy and represents—the probability of the validator's correct attestation. A validator with a higher accuracy will have a higher verification or validation level.

In some embodiments, smart contract 310 is used to capture details of an agreement between a validator 100 and requester 116. In some examples, service provider A 302 is a validator and may have previously attested to the user 102a PII that is required from service provider B 304 which is a requester, and service provider B 304 accepts service provider A as a trusted validator. In some examples, service provider B 304 acting as requester offers a price to service provider A 302 acting as validator to provide an attestation of the user 102a's PII. In further examples, service provider A 302 acting as validator may advertise a price (for example to service provider B 304 acting as requestor) to provide an attestation of the user 102a's PII. In some examples, the price offered is represented in tokens that are used in system 300. The agreement between service provider B 304 acting as requester and service provider A 302 acting as validator may be captured in smart contract 310. Service provider A 302 acting as validator interacts with smart contract 310 and service provider B 304 acting as requester interacts with smart contract 310. In some examples, smart contract 310 may include details of escrow, where the agreed price in tokens is placed pending the completion of the interaction between user 102a and service provider B 304 acting as requester. In some examples, smart contract 310 is an application, module, or other software component or code that is stored on the marketplace blockchain 250 and configured to execute when one or more actions take place in system 300. In some examples, smart contract 310 may be an application, service daemon, routine, or other executable logic. Smart contract 310 may be executed on an operating system or on a virtual machine, on multiple processing nodes in a decentralized form, or may be run in any other appropriate environment. In some embodiments, smart contract 310, when executed, causes a graphical user interface to be displayed on user device 306. In other embodiments, smart contract 310 allows for input through a non-graphical user interface, such as a user interface that accepts text or vocal input without displaying an interactive image. A graphical user interface may be displayed on a screen of user device 306, or a monitor connected to a desktop or laptop computer or on any other display. User 102a may interact with e.g. the graphical user interface on the device by typing, clicking a mouse, tapping, speaking, or any other method of interacting with a user interface. The graphical user interface on the device may be a web-based user interface provided by a web browser (e.g. Google Chrome (Google, Mountain View, California), Microsoft Internet Explorer (Microsoft, Redmond, Washington), or Mozilla Firefox (Mozilla Foundation of Mountain View, California), or may be any other type of interface.

System 300 may include token contract 314 and pricing contract 312 as part of marketplace blockchain 250. A token contract 314 is a distributed ledger on a smart contract platform that tracks the ownership of every token. A pricing contract 312 contains the listing price that validator 100 requests for a one-time validation of PII transmitted between user 102a and requester 116. In embodiments, other contracts that can be used include an escrow contract which encodes the transaction of tokens between requester 116 and validator 100 or user 102a, an ontology contract which defines what kind of predefined PII are traded in the system, and an IDV (Identification Verification) registry which defines what validators are registered in the system as well as a digital "fingerprint" of their associated metadata, for example their public key. In examples, any of these kinds of contracts can be used concurrently with or instead of token contract 314 and pricing contract 312. In examples, validator 100 is incentivized to maintain their self-defined accuracy or level. This is achieved by requiring that validator 100 pays a penalty to the network if requestor 116 flags to indicate a belief that validator 100 has attested erroneously. In implementations, the penalty paid to the network is linked to the flagging process of requestor 116. In examples, validator 100 will pay this penalty out of a stake of tokens. In some examples, to use the system, validator 100 must maintain a minimum stake of tokens defined by smart contracts 310 or smart rules of tokens. in the system as well as a fingerprint of their associated metadata e.g. public key.

In general overview, FIG. 4A illustrates a method that may be performed by service provider A 302 acting as a validator in system 300. In a general overview of FIG. 4A, in step 400, service provider A 302 validates user 102a's PII using its existing validation methods. In step 402, service provider A 302 creates an attestation to user 102a's PII on attestation blockchain 114. In step 404, service provider A 302 and service provider B 304 agree on a price for the attestation of the user 102a's PII. Following transmission of PII between user 102a and requester 116, in step 406 tokens are released from escrow to service provider A.

Referring to FIG. 4A in more detail, in some embodiments, no prior attestation for user 102a's PII exists. Service provider A 302 validates user 102a's PII using its existing validation methods. In some examples, service provider A validates user 102a's PII using validation methods that adopted by the system as acceptable validation methods. In some examples service provider A validates user 102a's PII using one or more validation methods that are specific to the type of PII of user 102a. For example, if the PII of user 102a is a birth certificate, service provider A may validate the birth certificate by consulting a birth records registry. In another example, if the PII of user 102a is a driver's license, service provider A may validate the driver's license by consulting a registry of licensed drivers maintain by a driver or motor vehicle registry. In some embodiments, PII of user 102a may be validated by service provider A by referencing information that is not the same as the PII of user 102a. For example, user 102a may provide their age to service provider A, and service provider A may validate user 102a's age by consulting a birth records registry to find the date of birth of user 102a, from which service provider A may calculate the age of user 102a. Once service provider A has validated user 102a's PII, service provider A 302 records an attestation to that PII on attestation blockchain 114.

Figure 4B:
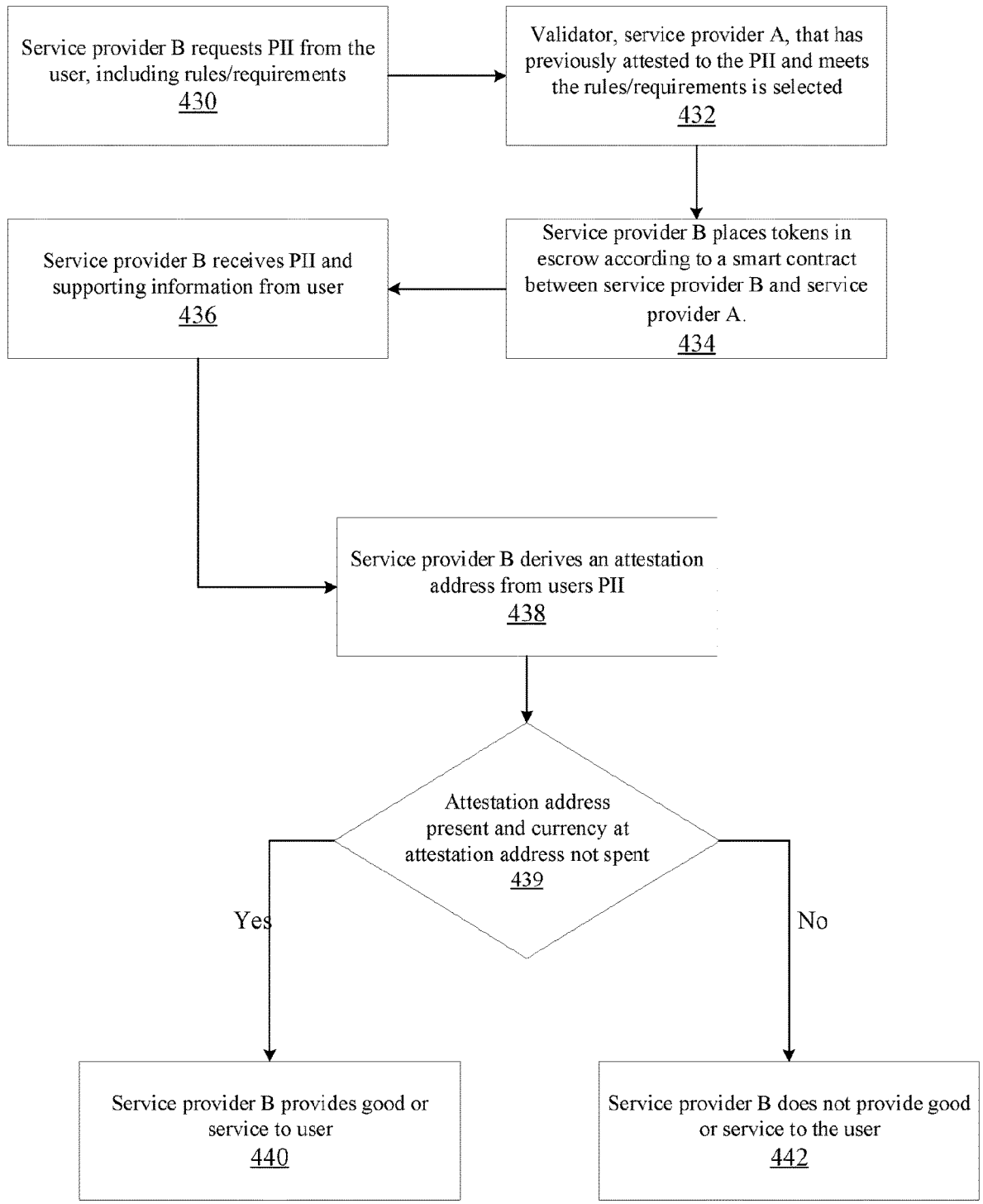
FIG. 4B shows a method performed by a service provider B acting as a requester in the system for attestations, according to some implementations.

In a general overview of FIG. 4B, in step 430, service provider B 304 requests access to all or certain portions of PII from the user 102a, including any rules or requirements, for example rules and requirements with respect to what specific information service provider B 304 is willing to accept in fulfillment of the request. In step 432, service provider B 304 and user 102a agree on a mutually acceptable validator, service provider A 302, that has previously attested to the requested PII. In step 434, service provider B 304 places tokens in escrow according to a smart contract 310 between service provider B 304 and service provider A 302. In step 436, service provider B 304 receives PII from user 102a in addition to information required to recreate the attestation address derived from user 102a's PII. In step 438, service provider B 304 recreates an attestation address derived from user 102a's PII. In step 439, service provider B 304 accesses the attestation ledger and verifies that the transaction at the attestation address on attestation blockchain 114 is valid and has not been revoked. In step 440, if service provider B 304 is satisfied that the transaction at the attestation address has not been revoked, service provider B 304 provides the good or service to user 102a. In step 442, if the attestation cannot be found on the ledger or the attestation is revoked, service provider B 304 does not proceed with providing service to the user. In step 430, service provider B 304 requests access to all or certain portions of PII from the user 102a, including any rules or requirements, for example rules and requirements with respect to what specific information service provider B 304 is willing to accept in fulfillment of the request.

Referring to FIG. 4B in more detail, in step 430, in some embodiments, an identity verification application on user 102a's device 306 may determine whether the requirements stipulated by service provider B 304 are met with the PII that is sent to service provider B 304 by user 102a In some embodiments, an identity verification application at service provider B may determine whether the requirements stipulated by service provider B 304 are met with the PII that is sent to service provider B by user 102a. In some embodiments, if the PII sent by user 102a to service provider B 304 does not meet the rules or requirements, service provider B will send a further request to user 102a specifying what different or additional information service provider B requires. In step 432, service provider B and the user agree on a mutually acceptable validator. In some embodiments, service provider B has a while list of acceptable validators and sends the whitelist to user 102a. In embodiments, user 102a and service provider B have whitelists of acceptable validators and an identity verification application, for example an identity verification application on user device 306 or at service provider B will choose a validator that is present on both user 102a's whitelist and service provider B's whitelist. In some examples, an identity verification application, user 102a, or service provider B 304 will choose one of several mutually acceptable validators. In embodiments, service provider B 304 will choose a mutually acceptable validator that has an acceptable level. In embodiments, service provider B 304 will choose a mutually acceptable validator for which the payment for a correct validation is below a specific threshold. In step 434, service provider B 304 places tokens in escrow according to a smart contract between service provider B 304 and service provider A 302. In examples, service provider B places the tokens in escrow prior to receiving information from service provider A that is necessary to create the attestation address associated with the PII from user 102a. For example, in some embodiments, service provide A only provides one or more public keys necessary for service provider B to create the attestation address after service provider B places the tokens in escrow. In step 436, service provider B 304 receives PII from user 102a in addition to information about service provider A 302. In some embodiments, service provider B receives PII from user 102a before placing tokens in escrow for service provider A 302, and only receives information about service provider A 302 from user 102a after the tokens are placed in escrow. In embodiments, user 102a PII and/or information about service provider A is released to service provider B upon placing tokens in escrow according to a smart contract on marketplace blockchain 250. In some embodiments, user 102a sends PII in plain text to service provider B 304. In some embodiments, user 102a PII is sent from user 102a to service provide B 304 using a secure or encrypted tunnel. In some examples, user 102a PII is sent from an identity verification application on user device 306 to an identity verification application at service provider B. In embodiments, user PII is sent using a QR code which is sent by the identity verification application on user device 306 and received by the identity verification application at service provider B. The QR code may be visually displayed on a display of user device 306 and may be scanned by a QR code scanner at service provider B.

In step 438, service provider B 304 creates an attestation derived from user 102a's PII and using at least service provider A's public key. In step 439, service provider B accesses attestation blockchain 114, and verifies that the transaction at the attestation address on attestation blockchain 114 is valid and has not been revoked. In step 440, if service provider B 304 is satisfied that the transaction at the attestation address is valid and has not been revoked (e.g. due to a non-zero value being associated with the attestation address, or a transaction with a positive value associated with the address having been recorded and no transaction with a corresponding negative value having been subsequently recorded), service provider B 304 provides the good or service to user 102a. If service provider B is satisfied that the requested PII of user 102a is authentic, then the tokens corresponding to the price of that attestation are released from escrow. In some embodiments, the tokens are placed into escrow via the smart contract 310 before the user transmits the PII and service provider B can verify user 102a's PII.

In step 442, if the attestation is invalid or has been revoked, service provider B does not provide the good or service to user 102a. In examples, the tokens placed into escrow are not paid out. In some examples, if a verification is not successful, service provider B may be able to receive a refund of the tokens back into service provider B's account.

Figure 4C:
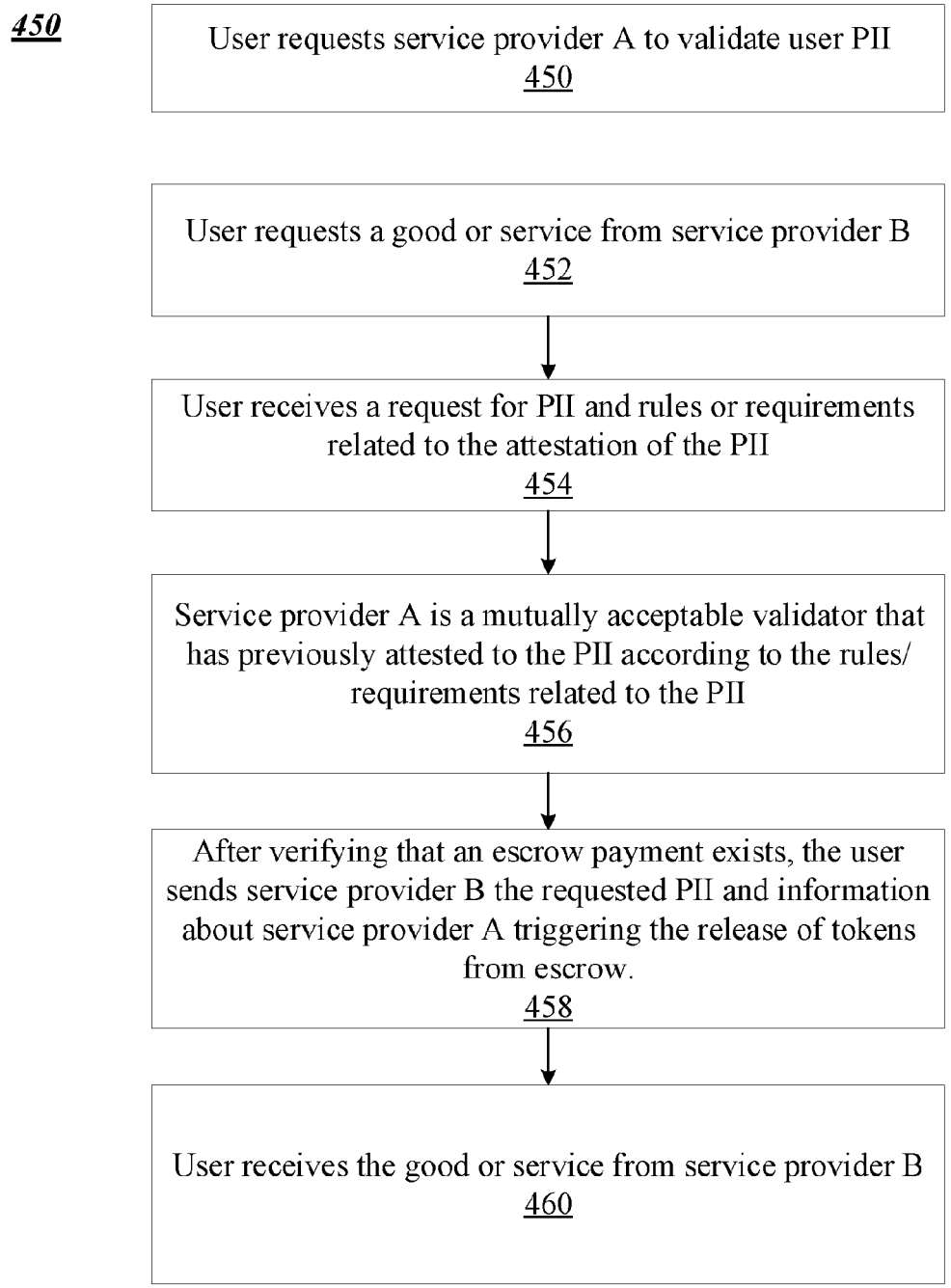
FIG. 4C shows a method performed by a user in the system for attestations, according to some implementations.

FIG. 4C illustrates a method that may be performed by user 102a in system 300. In step 450, user 102a requests service provider A 302 to validate user PII. In step 452, user 102a requests a good or service from service provider B 304. In step 454, user 102a receives a request from service provider B 304 acting as a requester (such as requester 116), for PII as well as rules or requirements relating to the attestation of the PII. In step 456, a mutually acceptable validator that has previously attested to the user's PII according to the rules/requirements related to the PII is selected. In step 458, after the user verifies that an escrow payment exists or has been made, user 102a sends service provider B 304 the requested PII and information about the mutually acceptable validator which may trigger the release of tokens from escrow. In some embodiments, the tokens are released to at least one of user 102a, the mutually acceptable validator, or system 300. In step 460, user 102a receives the good or service from service provider B 304.

Referring to FIG. 4C in more detail, in some embodiments, user 102a may apply for a product or service from service provider B 304 and send the required PII from the identity verification application on the user's device 306. In some embodiments, once service provider B 304 has paid tokens into escrow, user 102*a*, through their identity verification application on user device 306, can send service provider B 304 the PII with the information necessary to create the attestation address to on the attestation blockchain 114. Service provider B 304 then reconstructs a root hash (such as a Merkle Tree root hash) from the provided PII, creates the attestation address and checks the validity of a transaction at that attestation address on the attestation blockchain 114. In step 460, user 102*a* may receive the goods and services before the tokens are released from escrow. In some embodiments, the tokens may be shared between user 102*a* and service provider A 302 at a ratio defined by the smart contract 310. In some embodiments, service provider B 304 offers a certain price in the escrow contract. In some embodiments, service provider A 302 may advertise a price in the escrow contract. In some embodiments, system 300 receives a fee, for example a transaction fee from the tokens that are released from escrow. In examples, user 102*a* will send information to service provider B once the payment was received into escrow. In some embodiments, identity verification application on user device 306 will transfer this information to service provider B once the identity verification application receives confirmation that service provider B 304 has paid the required tokens into escrow.

Figure 5:

In general overview, FIG. 5 shows an illustration of the system goals. In one embodiment, incentives are built into the system through a combination of decisions, flags, penalties and rewards in a repeated interaction between the validator and the requester. The validator is incentivized to maintain their self-defined accuracy. This is achieved by requiring that the validator pays a penalty to the network if they attest PII erroneously. The validator will pay this penalty out of a stake of tokens. The validator must maintain a minimum stake of tokens to use the network.

Referring to FIG. 5 in more detail, the requester is rewarded when they report erroneous attestations, but it not incentivized to falsely report correct attestation. At the Nash equilibrium of the game, whereby no participant in the game can gain an advantage by unilaterally changing their strategy if the other participants maintain their strategies, exists in the system when the validator attest a correct attestation and the requester accepts the correct attestation. In FIG. 5, R represents the requester, and V represents the validator. '+' represents a reward for behavior in the system, and '−' represents a penalty for behavior in the system. The purpose of the incentives is to achieve equilibrium states, where correct validations that are accepted by requesters lead to rewards to both parties, while incorrectly validated PII correctly rejected yields requester rewards, increasing the overall system reliability.

Figure 6A:
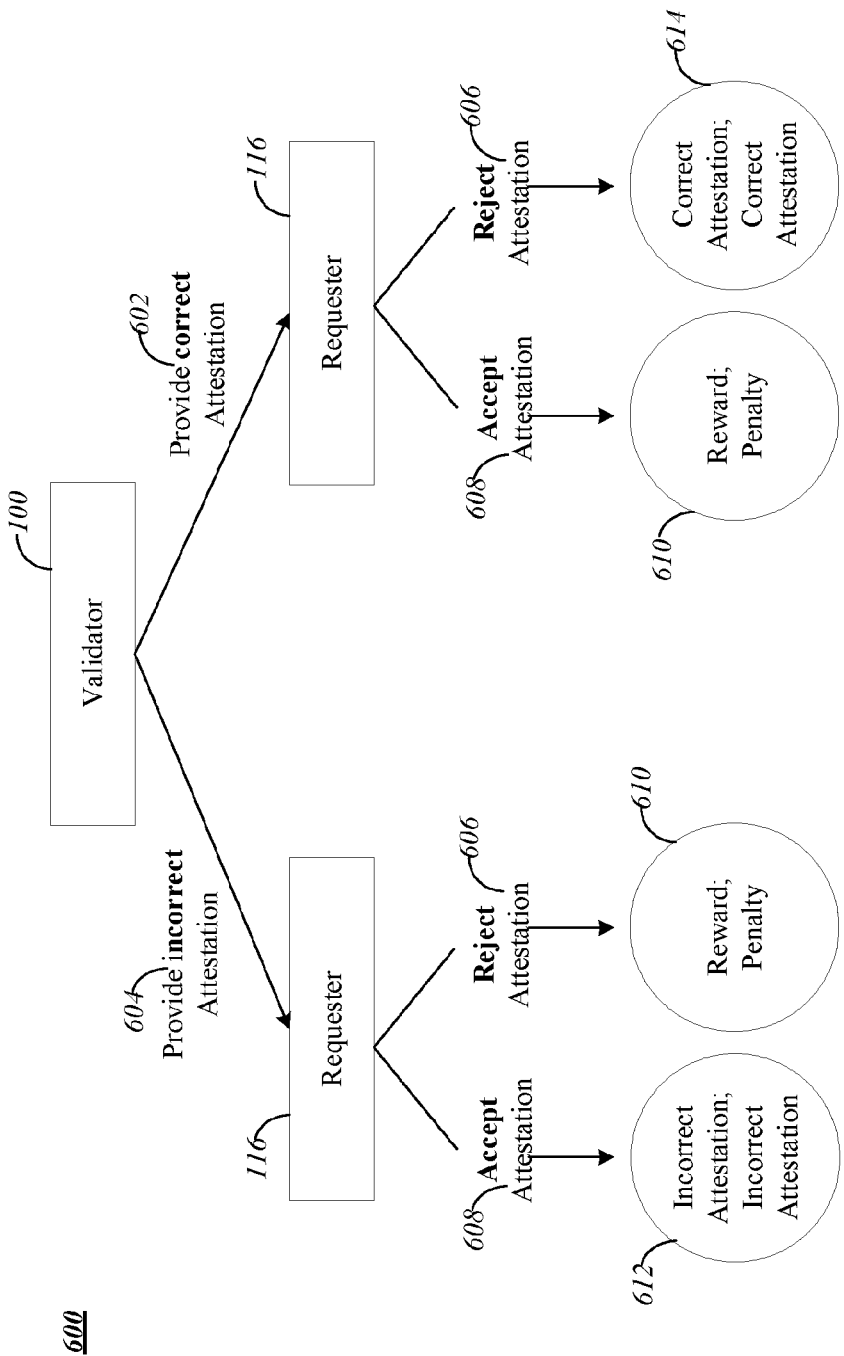
FIG. 6A shows an example of an extensive form of the interaction between requester and validator, according to some implementations.

FIG. 6A shows an extensive form of the interaction between requester 116 and validator 100. To create a decentralized identity management system that exhibits a high level of accuracy, the system makes use of embedded incentives that reward accuracy, and penalties that discourage acting falsely. If the system becomes unreliable or unpredictable, then requesters may avoid using it. The problem is how to decide whether the information provided by either the requester 116 or the validator 100 is correct or incorrect. In the identity system, there is a second decision to be made by the validator. In the identity system, the user is removed from the design of incentives in the system, because it is assumed that validators treat all user's PII submissions as false, which is why they set out to verify them in the first place. It is the role of the validator alone to ensure the accuracy of their attestations of User PII. This reduces the system to a two-player game comprising a validator and a requester. In this system, the validator provides the requester with an attestation, where the attestation is either correct or incorrect. The requester reviews the attestation and has two options—either to accept or reject it. The requester must be adequately incentivized to reject an incorrect attestation and to accept a correct attestation. In both cases, the outcome is (R (reward); Pe (penalty)). There is no information available regarding whether the validator has provided an incorrect or correct attestation, other than if the requester rejects it. This has the effect that R can never be greater than the utility of a correct attestation ('CA'). In other words, the requester should not receive greater reward or profit by rejecting an incorrect attestation than by accepting the correct attestation (i.e. R<CA), thus encouraging requesters to accept attestations unless they believe they are incorrect.

Figure 6B:
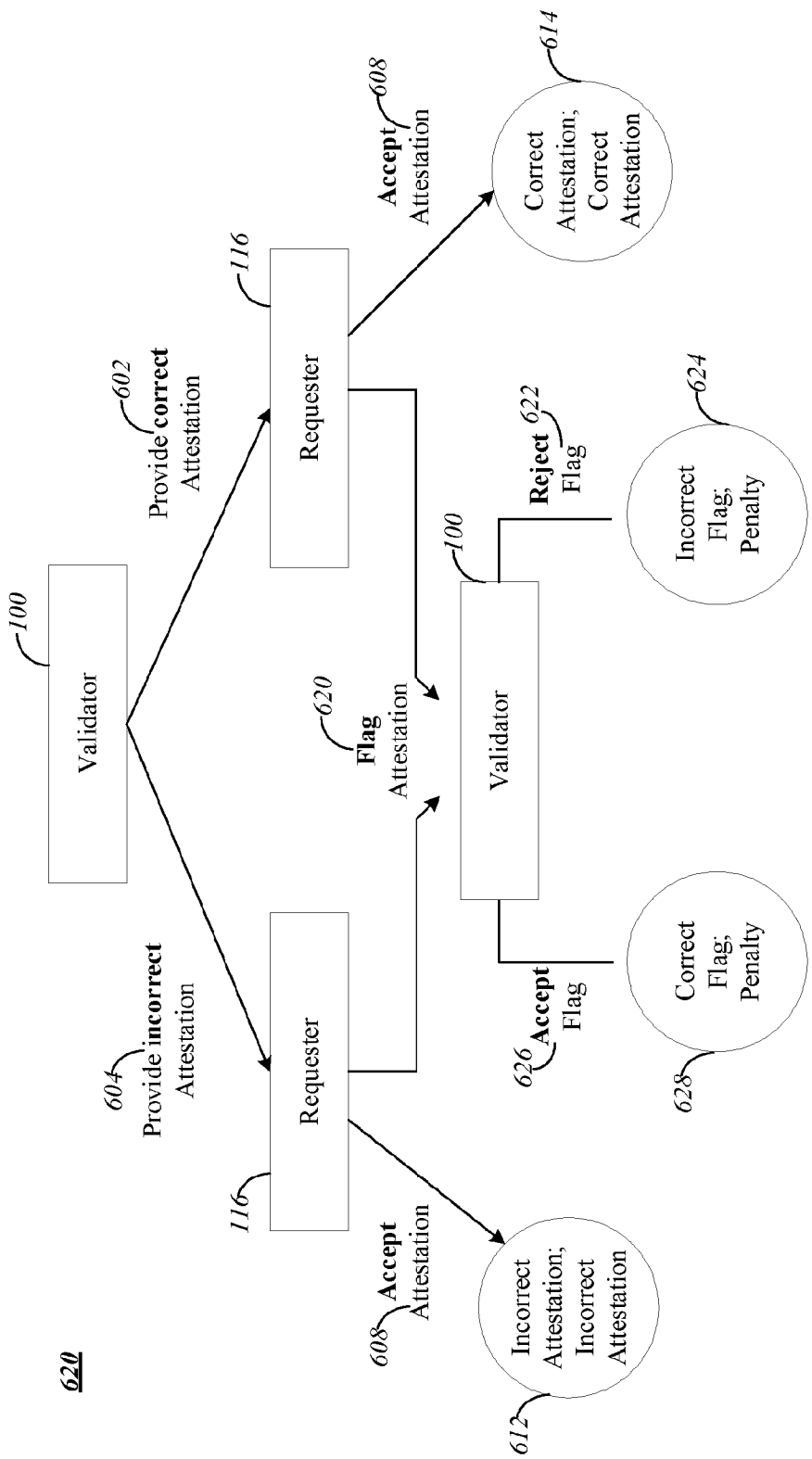
FIG. 6B shows another example of an extensive form of the interaction between requester and validator, according to some implementations.

In general overview, FIG. 6B shows an extensive form of the interaction between requester 116 and validator 100 operating in an outcome space. The requester 116 reviews the validator's 100 attestation and has two options, to either flag the attestation as incorrect or to accept the attestation. If the validator 100 provides an incorrect attestation 604, and the requester 116 accepts this attestation 608, the outcome for both the validator and requester is an incorrect attestation 612. If the validator 100 provides a correct attestation 602 and the requester 116 accepts the attestation 608, the outcome for both the requester and validator is a correct attestation 614. If the requester 116 flags the attestation as incorrect 620, then the validator 100 can either accept 626 or reject the flag 622. The 'correct flag' is the actual reward for a correct flag and the 'incorrect flag' is the actual reward for an incorrect flag. If the validator 100 provides an incorrect attestation 604 and the requester 116 flags this attestation 620, the validator 100 accepts this flag 626. The outcome for the requester 116 and validator 100 is a 'correct flag' and a penalty respectively 628. If the validator 100 provides a correct attestation 602 and the requester 116 flags the attestation 620, the validator 100 rejects the flag 622. The outcome for the requester 116 and validator 100 is an 'incorrect flag' and a penalty respectively 628.

Referring to FIG. 6B in more detail, the penalty is kept the same regardless of whether a validator 100 accepts or rejects a flag. Assuming the primary non-financial motivation of the validator 100 would be to make its own system more robust, this would incentivize honesty through accepting a flag if it is indeed an incorrect attestation, since it costs the validator 100 the same regardless. The validator 100 may only accept correct flags and only reject incorrect flags. Since the penalty is the same regardless of whether the validator 100 accepts or rejects a flag, the validator 100 could potentially reject correct flags to discourage requesters 116.

The four game outcomes of FIG. 6B can be reduced into a simplified normal form. An attestation game is a sequential game with two actors, a requester and a validator operating in an outcome space represented as a tuple of utility gains (Requester;Validator). The four game outcomes of FIG. 6B are {Correct Attestation; Correct Attestation (CA;CA) 614, Incorrect Attestation; Incorrect Attestation (IA; IA) 612, Correct Flag; Penalty (CF; Pe) 628, Incorrect Flag; Penalty (IF; Pe) 624}. A Fee is given by the requester to the validator for the game to be initiated, CF is the reward for a correct flag and IF is the reward for an incorrect flag.

The following constraints (Proposition 1) produce an exclusive Nash equilibrium of (CA; CA):

$$CA > IF > IA | CA, IF, IA \in \mathbb{R}$$

$$CF > IA | CF, IA \in \mathbb{R}$$

1. (CA; CA): The requester and validator would remain here. Because CA>IF and CA>IA, this scenario produces more utility for both. Therefore (CA; CA) is a Nash equilibrium.
2. (IF; Pe): The requester would want to move to (CA; CA) to maximize utility given the validator's action and the validator is indifferent given the requester's action. Therefore, this is not a Nash equilibrium.
3. (IA; IA): The requester would want to move to (CA; CA) since CA>IA and so would the validator. Therefore, this is not a Nash equilibrium.
4. (CF; Pe): The requester would want to remain since CF>IA and the validator is indifferent; it cannot be guaranteed he would not want to move to (IF; Pe). Therefore, this is not a Nash equilibrium.

This demonstrates that (CA; CA) is the only Nash equilibrium.

If CF, IF<IA, there is no incentive for the requester to flag the attestation. In a repeated game, if the expected reward from flagging is larger than CA then the requester should flag all attestations. With the addition of additional qualitative constraints:

1. CF, IF≤I Pe I, since the reward is paid out from the penalty Pe.
2. IA>Pe, since this is additional discouragement for the validator to provide an incorrect attestation, as the cost of a penalty is greater than the cost of the incorrect attestation being accepted.
3. Fee<IPeI to ensure that the penalty a validator faces is always larger than the Fee it charges, disincentivizing it from providing incorrect attestations while still making a profit. We assume IA<0 since the legal consequences of accepting invalid user data (reputationally and/or financially due to a fine) would outweigh any short-term convenience An attestation game is well-posed if the constraints in Proposition 1 and the qualitative constraints are both satisfied. In other words:

$$CA > IF > 0 > IA > Pe$$

$$CF > IA \text{ and } CF, IF, \text{Fee} \leq |Pe|$$

Given always rational actors in a well-posed attestation game and P (IA) being the probability of a validator providing an incorrect attestation, the probability of a validator providing a correct attestation is P (CA)=1−P (IA). Then P (CF):=P ((CF; Pe))=P (IA) and P (IF):=P ((IF; Pe))=P (CA).

If the validator provides an incorrect attestation, then the requester's choices are to accept it, for a utility gain of IA or to flag it for a utility gain of CF. Since CF>IA, and the requester is always rational, the requester will always choose to flag. Therefore P (CF|IA)=1, so P (CF)=P (CF|IA) P (IA)=P (IA). A similar argument holds for P (IF)=P (CA).

The reward function Re is a discrete random variable over {(CF; Pe); (IF; Pe)}. With Re ((CF; Pe))=CF and Re ((IF; Pe))=IF. Its probability mass function is given by $$P(CF) = P(IA) \text{ if } Re = CF$$

$$P(IF) = P(CA) \text{ if } Re = IF$$

Define R as the expected value of Re, that is $$R := E[Re] = P(CF)CF + P(IF)IF$$

A reward function Re (with E [Re]=R) is well-posed if:

$$IA < R < CA \text{ and } R < |Pe|$$

We will want to choose IF and CF in such a way that Re is well-posed. The required network incentives are created through a proof-of-stake mechanism making use of the token.

P is the probability of a correct attestation (P(CA)) and $$\text{Level} = \frac{1}{1-P}$$

This P is determined by the validator and can also be considered as the validators accuracy.

In some embodiments, different confidence levels of accuracy are required for different applications. For example, confidence levels greater than 99.9% may be required for critical use cases. Lower confidence levels may be acceptable for less critical use cases. In some examples, it is more costly for a validator to authenticate user PII to a higher confidence level. The system many include many validators that can provide different levels of accuracy, with associated adjustments in prices per attestation. In some embodiments, the system includes penalties for validators that create attestations that are not truthful, creating strong incentives for validators to be accurate and truthful.

In general overview, FIG. 7 illustrates sample levels of different validators. Requesters must be confident that validators will maintain a level of accuracy required for their use cases. The identity system disclosed herein may be a decentralized system, and the enforcement of accuracy cannot be achieved through a central authority and must instead rely on rewards and penalties. The incentives required to drive the system towards accuracy are created using a branch of game theory called backward induction. In backward induction, the end goal is decided and then a game is designed to attempt to reach this goal.

Figure 8:
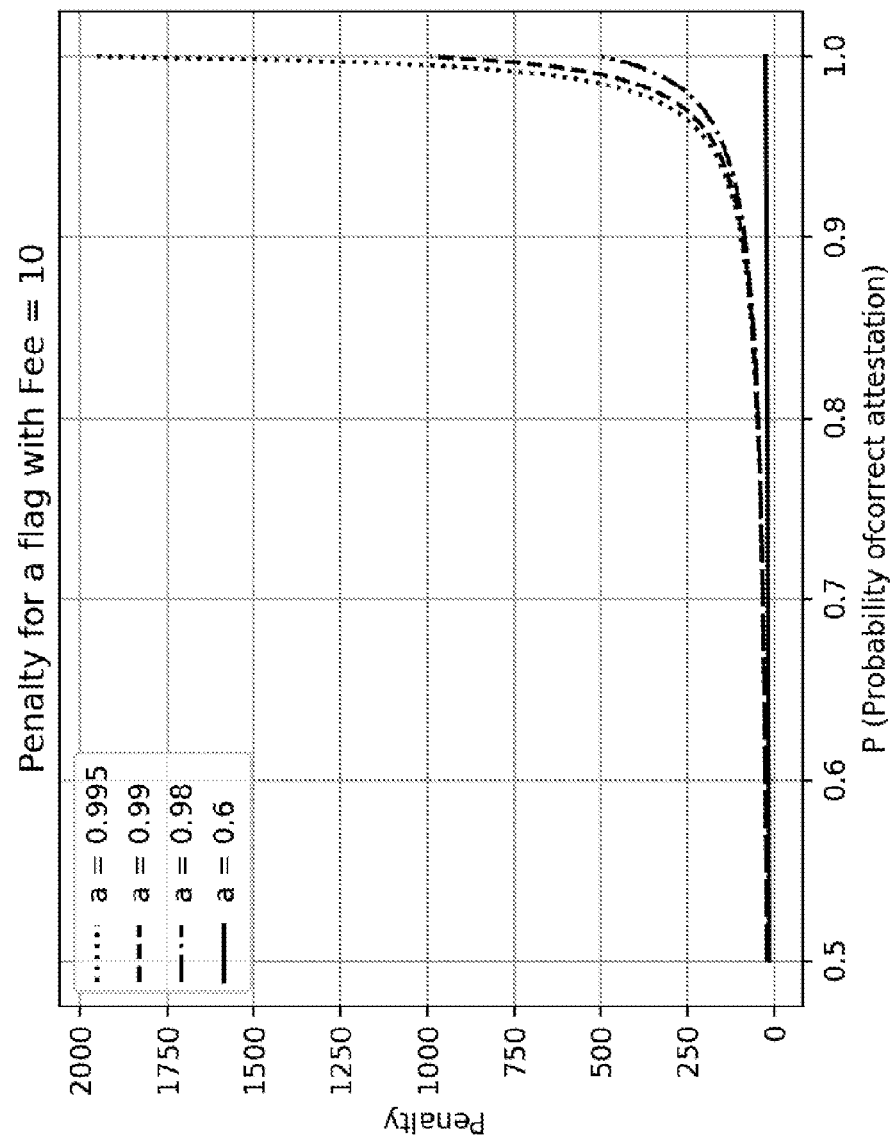

In general overview, FIG. 8 illustrates the penalty for a flag as the level varies for different values of a system constant (a). It is proposed that a penalty Pe satisfies the conditions for a well-posed attestation game and subsequently the rewards for a correct flag (CF) and incorrect flag (IF) which produce a well-posed reward function Re.

$$Pe = -\frac{\text{Fee}}{1-aP}, a \in [0, 1]$$

a is a configurable parameter that can be adjusted if observations indicate penalties are too high or too low. Fee<IPeI, in other words the above Pe is valid for a well-posed attestation game. It is noted that $$0 \leq aP \leq 1 \Rightarrow 0 \leq 1 - aP \leq 1 \Rightarrow \frac{1}{1-aP}. \text{ So}$$

$$|Pe| = \frac{\text{Fee}}{1-aP} \geq \text{Fee}$$

In the rewards CF and IF the process introduces a weighting factor to include a dependence on the flagging history of the requester. Should a requester have a high ratio of previously accepted flags, it should produce a higher reward. This incentivizes the requester to only submit flags if they are likely to be accepted (i.e. incorrect attestations).

AF is defined as the ratio of accepted flags to the total flags in its history. Clearly $0 \leq AF \leq 1$. $w \in [0,1]$ is defined as the weight parameter to indicate how much AF should be weighted in the rewards. w is configurable based upon the behavior of the system. The reward for setting a correct flag CF is defined as $$CF = [w + (1-w)AF] \cdot \frac{|Pe|}{2}$$

and the reward for an incorrect flag IF is $$IF = [w + (1-w)AF] \cdot \frac{|Fee|}{2}$$

By definition CF, IF≤|Pe| and therefore are valid for a well-posed attestation game. For future purposes express CA=Fee+S where S>0 is any savings gained by using the system. We can see 0<IF<Fee<CA as required. Now Re can be defined and the formula for R=E (Re) becomes:

$$R = [w + (1-w)AF] \cdot P(IA) \cdot \frac{|Pe|}{2} + [w + (1-w)AF] \cdot P(CA) \cdot \frac{|Fee|}{2}$$

This formula can be simplified to $$R = \frac{1}{2}[w + (1-w)AF] \cdot \left[P(IA) \cdot \frac{Fee}{1-aP} + P(CA) \cdot Fee\right]$$

R, as defined, can be shown to be well posed:

→ $0 \leq P(CA), P(IA) \leq 1$ as they are probabilities, and $P(CA) = 1 - P(IA)$ → $w + (1-w)AF \leq w + (1-w)$ since $0 \leq AF \leq 1$ → $w + (1-w)AF \leq w + (1-w) = 1$ since $0 \leq AF \leq 1$ by defintion → $aP \leq 1 \rightarrow 1 - P \leq 1 - aP \rightarrow \frac{1}{1-aP} \leq \frac{1}{1-P}$ → $\frac{1}{1-P} = \frac{1}{P(IA)}$ For R to be well posed it needs to satisfy the constraints previously stated:

$IA < R < CAR$ and $R < |Pe|$ $$R = \frac{1}{2}[w + (1-w)AF] \cdot \left[P(IA)\frac{Fee}{1-aP} + P(CA) \cdot Fee\right] \leq$$

$$\frac{1}{2}\left[P(IA)\frac{Fee}{1-aP} + P(CA) \cdot Fee\right] \leq$$

$$\frac{1}{2}[Fee + P(CA) \cdot Fee] \leq \frac{1}{2} \cdot 2 \cdot Fee = Fee < Fee + S = CA$$

Thus, the constraint R<CA is satisfied. Additionally, since IA<0, then:

$$R = \frac{1}{2}[w + (1-w) \cdot AF] \times \left[P(IA)\frac{Fee}{1-aP} + P(CA) \cdot Fee\right] \geq 0 \geq IA$$

The final requirement is that R<|Pe|:

$$R \leq \left[P(IA)\frac{Fee}{1-aP} + P(CA) \cdot Fee\right] \leq$$

$$\left[P(IA)\frac{Fee}{1-aP} + P(CA)\frac{Fee}{1-aP}\right] \leq [P(IA) + P(CA)]\frac{Fee}{1-aP} = \frac{Fee}{1-Ap} = |Pe|$$

The parameter "a" adjusts the penalty and FIG. 8 illustrates how it influences this.

The reward scales with how many previous flags have been accepted. Therefore, the requester is also incentivized to be honest when flagging in a repeated game scenario. Even when a requester has had all its previous flags rejected, it is still incentivized to flag an incorrect attestation as there is a non-zero minimum reward (dictated by the weight parameter w). This is a feedback mechanism i.e. if a requester has a high ratio of accepted flags (due to having a high rate of previously accepted flags), and decides (for whatever reason, even though it will always be lower than CA as shown above) to flag correct attestations, it will be rejected, and future rewards will be lower.

Since |Pe|>R in all scenarios, there will be excess incentive amounts |Pe|−R. These incentive amounts may be locked away separately (not using a centralized solution). In the instance a validator accepts a flag, these incentive amounts will be used to pay out all previous requesters who accepted that attestation or will be distributed to all validators.

In a repeated game, which this is, it can then be shown that regardless of the discount factor (the discount of future game utility as is known in the art), the correct behavior is incentivized.

With a well-posed R in a repeated game with discount factor β<1, accepting correct attestations (honest) is more profitable than always flagging (dishonest). Proof:

The infinite geometric series identity holds as β<1 for convergence:

$$\text{Honest total payout: } \sum_{k=0}^{\infty}(CA)(\beta)^k = \frac{CA}{1-\beta}$$

$$\text{Dishonest total payment: } \sum_{k=0}^{\infty}(CA)(\beta)^k = \frac{R}{1-\beta}$$

Figure 9:
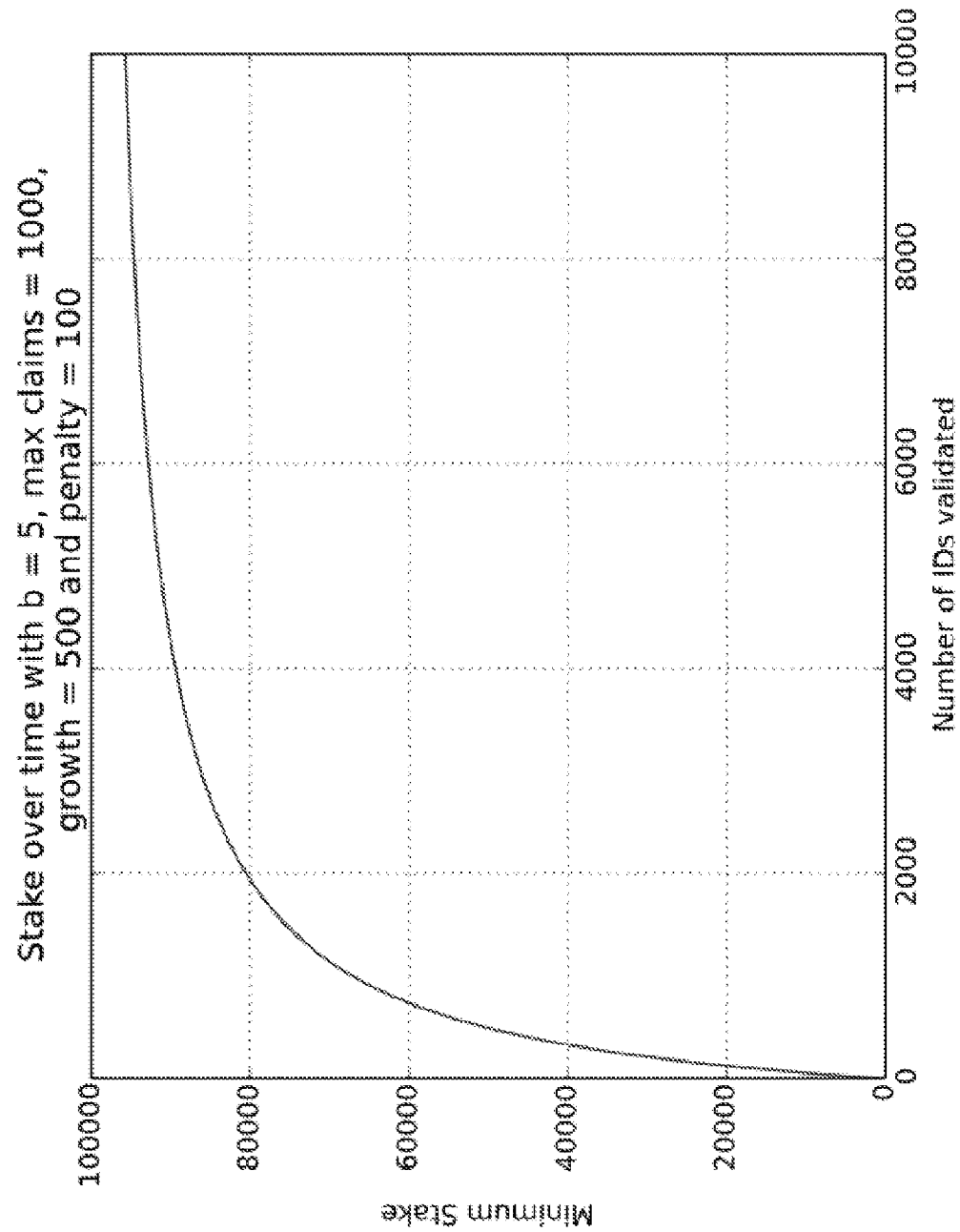

In general overview, FIG. 9 illustrates the minimum required stake as more IDs are validated for a set of values. Specifically, FIG. 9 illustrates the required stake of a validator with a penalty of 100 tokens per flag who performs 10,000 attestations. Referring to FIG. 9 in more detail, in order to ensure the right incentives are maintained, a staking mechanism is required. The staking mechanism requires a validator 100 to hold a defined minimum number of tokens in order to be an active participant in the system. To ensure that validators have a stake and can pay, they must maintain a minimum stake that secures them against expected claims.

This ensures that CA:CA is the Nash equilibrium in the repeated game. The expected claims are:

$$EC = \frac{Total_{ID}}{Level_{average}}$$

Where $Total_{ID}$ is the number of IDs that the validator has provided to requesters and $Level_{average}$ is the average level of a validator's IDs.

A stake function $Stake_{min}: \mathbb{R} \to \mathbb{R}$ is feasible if:
1. $Stake_{min}(0) \geq b \cdot |Pe|$, to cover a base amount of flagged attestations b (configurable by the network and related to EC when it is a new validator).
2.

$$\lim_{x \to \infty} stake_{min}(x) = |Pe| \cdot Claim_{max} + O(b),$$

where $Claim_{max} \in \mathbb{R}$ represents the maximum number of claims expected for a validator to reach.

$$\frac{dStake_{min}}{dx} > 0 \quad \frac{d^2 Stake_{min}}{dx} < 0 \text{ for } x \in (0, \infty)$$

3.
In other words, the minimum stake grows with diminishing additional costs to the validator. The current stake of a validator must always be greater than or equal to $Stake_{min}(total_{ID})$.

The minimum stake $(Stake_{min}(Total_{ID}))$ should be:

$$Stake_{min} = |Pe|\left(b + \frac{Claim_{max} \cdot Total_{ID}}{growth + Total_{ID}}\right)$$

Where growth $\in (1, \infty)$ modulates how quickly the required stake grows as a function of the total number of attestations of the validator. Proof;

$$Stake_{min}(0) = |Pe| \cdot b$$

$x = Total_{ID}$. Then:

$$\lim_{x \to \infty} |Pe| \cdot b \cdot |Pe| \cdot \frac{Claim_{max}}{\frac{growth}{x} + 1} = |Pe| \cdot b + |Pe| \cdot Claim_{max}$$

$$= |Pe| Claim_{max} + O(b)$$

$$\frac{d}{dx} \frac{x}{1+x} = \frac{1}{(1+x)^2} \text{ which is positive everywhere for } x \neq 1$$

$$\frac{d^2}{dx^2} \frac{x}{1+x} = \frac{2x}{(1+x)^3} - \frac{2}{(1+x)^2} = -\frac{2x}{(1+x)^3}$$

which is negative $\forall x > 0$ since $a^3 > 0, \forall a > 0$

The stake, through including Pe as a variable, is linearly dependent on Fee. This ensures that the stake (and the penalty itself) adjusts to changes in the value of the token in the system since inflation or deflation of a token may be accompanied by a fee adjustment by a validator. This stake ensures that there is enough protection for requesters. If the validator decides to leave the system, the stake decays over time using an exponential function, where more tokens are available to be withdrawn over time in an exponential manner.

The withdrawal stake percentage is defined as $100e^{t-F}$, where t is the time in minutes since the withdrawal was requested, up to 5 years and F is five years in minutes. At 5 years, 100% of the stake will be withdrawn. After say one year, only 1.83% can be extracted by the validator. Both requesters and validators can also choose to use other parties e.g. requesters can decide which validator to use and validators can decide which requesters to accept.

B. Computing and Network Environment of the Current Disclosure

Figure 10A:
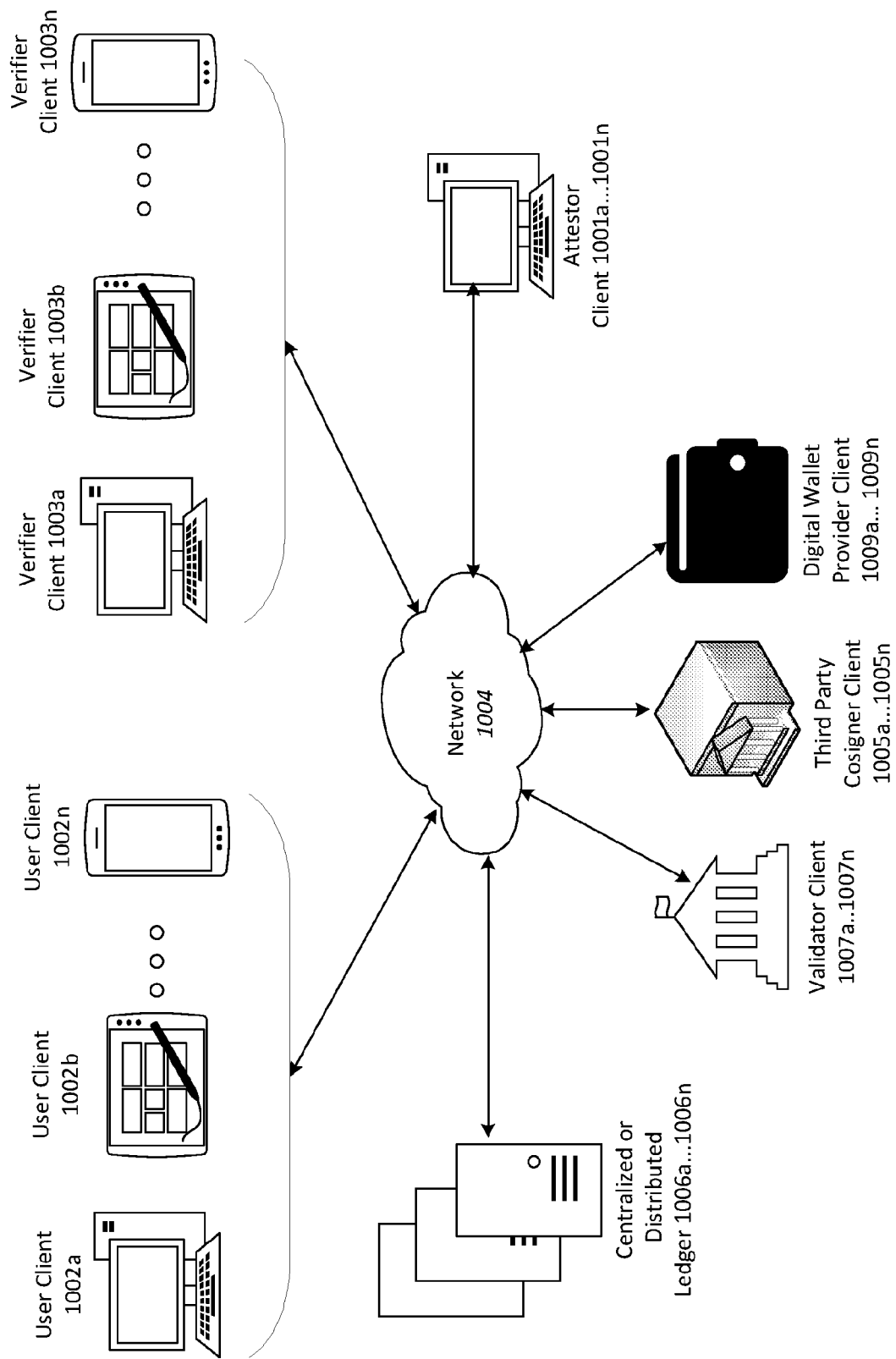
FIG. 10A is a block diagram depicting an embodiment of a network environment comprising a payment platform and an online identity verification system.

Prior to discussing specific embodiments of the present solution, it may be helpful to describe aspects of the operating environment as well as associated system components (e.g. hardware elements) in connection with the methods and systems described herein. Referring to FIG. 10A, an embodiment of a network environment is depicted. In a brief overview, the network environment includes one or more user(s) 1002a-1002n (also generally referred to as local user machines(s) 1002, user client(s) 1002, user client node(s) 1002, user client machine(s) 1002, user client computer(s) 1002, user client device(s) 1002, user endpoint(s) 1002, or user endpoint node(s) 1002) in communication with one or more verifier(s) 1003a-1003n (also generally referred to as local verifier machines(s) 1003, verifier client(s) 1003, verifier client node(s) 1003, verifier client machine(s) 1003, verifier client computer(s) 1003, verifier client device(s) 1003, verifier endpoint(s) 1003, or verifier endpoint node(s) 1003), and one or more third-party cosigner(s) 1005a-1005n (also generally referred to as local third-party cosigner machines(s) 1005, third-party cosigner client(s) 1005, third-party cosigner client node(s) 1005, third-party cosigner client machine(s) 1005, third-party cosigner client computer(s) 1005, third-party cosigner client device(s) 1005, third-party cosigner endpoint(s) 1005, or third-party cosigner endpoint node(s) 1005).

The one or more user(s) 1002a-1002n may be in communication with one or more validator(s) 1003a-1003n (also generally referred to as local validator machines(s) 1003, validator client(s) 1003, validator client node(s) 1003, validator client machine(s) 1003, validator client computer(s) 1003, validator client device(s) 1003, validator endpoint(s) 1003, or validator endpoint node(s) 1003, and one or more centralized or distributed ledger(s) 1006a-1006n (also generally blockchain(s) 1006, centralized or distributed ledger node(s) 1006, blockchain node(s) 1006, centralized or distributed ledger machine(s) 1006, or blockchain machine(s) 1006, via one or more networks 1004. User client(s) 1002a-1002n, verifier client(s) 1003a-1003n, validator client(s) 1007a-1007n, and third-party cosigner client(s) 1005a-1005n may interact with one or more attestor client(s) 1001a-1001n (also generally referred to as local attestor machines(s) 1001, attestor client(s) 1001, attestor client node(s) 1001, attestor client machine(s) 1001, attestor client computer(s) 1001, attestor client device(s) 1001, attestor endpoint(s) 1001, or attestor endpoint node(s) 1001).

In some embodiments, a user client 1002 interfaces with digital wallet provider client 1007. In some embodiments, the user client 1002 has a validated identity profile that can be verified. In examples, validator client 1007 may be operable to validate the identity of one or more users 1002. In embodiments, a validator client 1007 may be operable to validate information of an organization, a user, a company, a site, an object, a person, a group of people, and/or the relationship between any of a user, an organization, a company, a site, an object, a person, and a group of people and any other user, organization, company, site, object, person, and group of people. In some embodiments, verifier client 1003 may wish to verify the identity or any information of a user, a company, a site, an object, a person, a group of people, and/or the relationship between any of a user, an organization, a company, a site, an object, a person, and a group of people and any other user, organization, company, site, object, person, and group of people.

In some embodiments, one or more third-party cosigner(s) 1005a-1005n, may wish to cosign a validated identity of a user 1002. In examples, third-party cosigner(s) 1005 may digitally sign a record that is recorded on centralized or distributed ledger(s) 1006.

Although FIG. 10A shows a network 1004 between user clients 1002, verifier clients 1003, third-party cosigner clients 1005, attestor clients 1001, validator clients 1007, digital wallet provider clients 1009, and centralized or distributed ledgers 1006, the user clients 1002, verifier clients 1003, third-party cosigner clients 1005, attestor clients 1001, validator clients 1007, digital wallet provider clients 1009, and centralized or distributed ledgers 1006 may be on the same network 1004. In some embodiments, there are multiple networks 1004 between user clients 1002, verifier clients 1003, third-party cosigner clients 1005, attestor clients 1001, validator clients 1007, digital wallet provider clients 1009, and centralized or distributed ledgers 1006. In one of these embodiments, network 1004' (not shown) may be a private network and network 1004 may be a public network. In another of these embodiments, network 1004 may be a private network and network 1004' may be a public network. In still another of these embodiments, networks 1004 and 1004' may both be private networks.

The network 1004 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

The network 1004 may be any type and/or form of network. The geographical scope of the network may vary widely and the network 1004 can be a body area network (BAN), a personal area network (PAN), a local-area network (LAN), e.g. Intranet, a metropolitan area network (MAN), a wide area network (WAN), or the Internet. The topology of the network 1004 may be of any form and may include, e.g., any of the following: point-to-point, bus, star, ring, mesh, or tree. The network 1004 may be an overlay network which is virtual and sits on top of one or more layers of other networks 1004'. The network 1004 may be of any such network topology as known to those ordinarily skilled in the art capable of supporting the operations described herein. The network 1004 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. The network 1004 may be a type of broadcast network, a telecommunications network, a data communication network, or a computer network.

In some embodiments, the system may include multiple, logically-grouped servers providing the centralized or distributed ledgers 1006. In one of these embodiments, the logical group of servers may be referred to as a server farm or a machine farm. In another of these embodiments, the servers providing the centralized or distributed ledgers 1006 may be geographically dispersed. In other embodiments, a machine farm may be administered as a single entity. In still other embodiments, the machine farm includes a plurality of machine farms. The servers providing the centralized or distributed ledgers 1006 within each machine farm can be heterogeneous—one or more of the servers or machines can operate according to one type of operating system platform (e.g., Windows, manufactured by Microsoft Corp. of Redmond, Washington), while one or more of the other servers can operate according to another type of operating system platform (e.g., Unix, Linux, or Mac OSX).

In one embodiment, servers providing the centralized or distributed ledgers 1006 in the machine farm may be stored in high-density rack systems, along with associated storage systems, and located in an enterprise data center. In this embodiment, consolidating the servers providing the centralized or distributed ledgers 1006 in this way may improve system manageability, data security, the physical security of the system, and system performance by locating servers and high-performance storage systems on localized high-performance networks. Centralizing the servers and storage systems and coupling them with advanced system management tools allows more efficient use of server resources.

The servers 1006 of each machine farm providing the centralized or distributed ledgers 1006 do not need to be physically proximate to another server in the same machine farm. Thus, the group of servers logically grouped as a machine farm may be interconnected using a wide-area network (WAN) connection or a metropolitan-area network (MAN) connection. For example, a machine farm may include servers physically located in different continents or different regions of a continent, country, state, city, campus, or room. Data transmission speeds between servers in the machine farm can be increased if the servers are connected using a local-area network (LAN) connection or some form of direct connection. Additionally, a heterogeneous machine farm may include one or more servers operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc. of Fort Lauderdale, Florida; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, California.

Management of the machine farm may be de-centralized. For example, one or more servers may comprise components, subsystems and modules to support one or more management services for the machine farm providing the centralized or distributed ledgers 1006. In one of these embodiments, one or more servers provide functionality for management of dynamic data, including techniques for handling failover, data replication, and increasing the robustness of the machine farm. Each server may communicate with a persistent store and, in some embodiments, with a dynamic store.

Server providing the centralized or distributed ledgers 1006 may be a file server, application server, web server, proxy server, appliance, network appliance, gateway, gateway server, virtualization server, deployment server, SSL VPN server, or firewall. In one embodiment, a plurality of servers may be in the path between any two communicating servers.

Figure 10B:
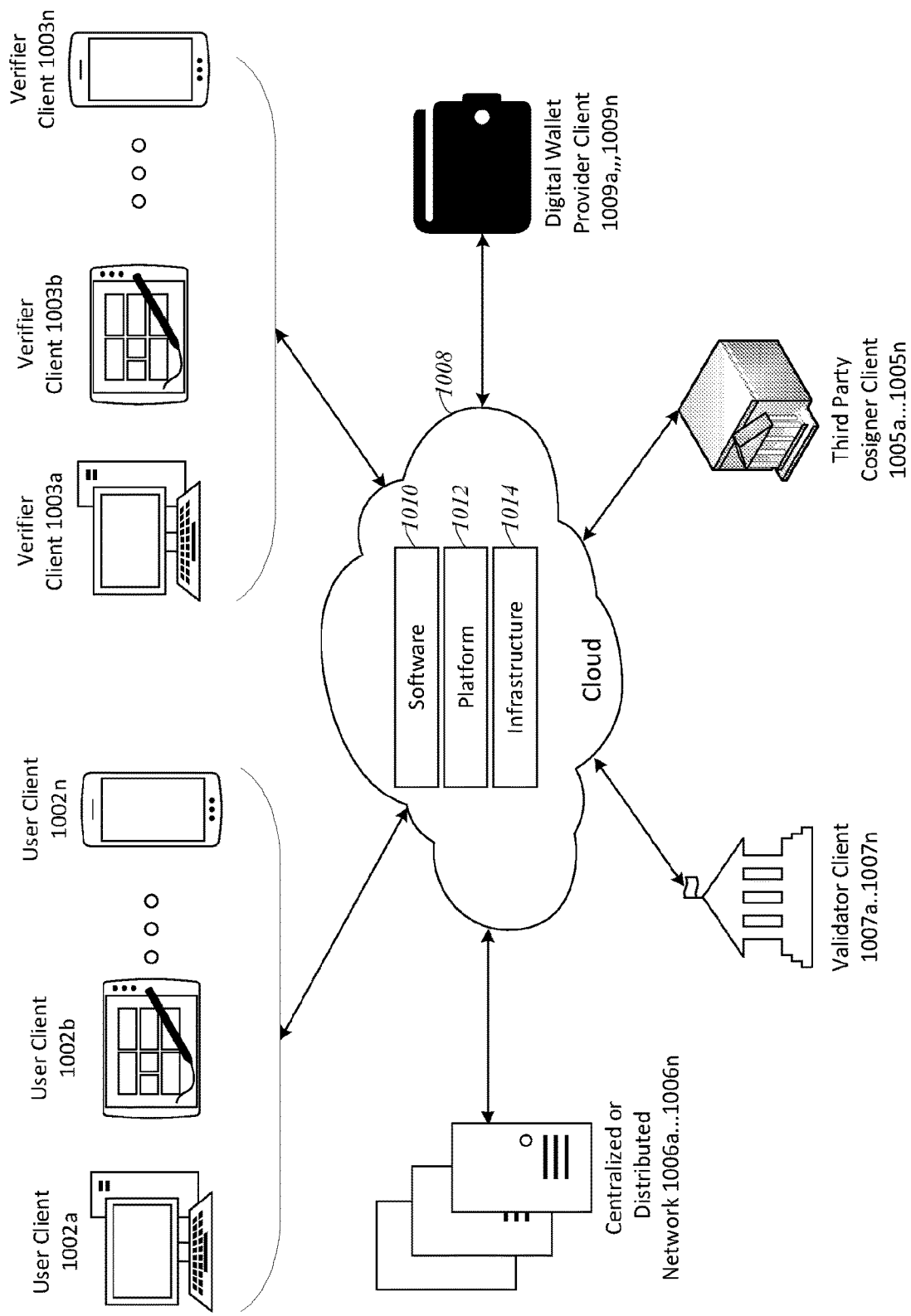
FIG. 10B is a block diagram depicting a cloud computing environment comprising users in communication with verifiers, digital wallet provider clients, third-party cosigners, validators, and one or more centralized or distributed ledger(s) via a payment platform configured to interact with an online identity verification system, according to some implementations.

Referring to FIG. 10B, a cloud computing environment is depicted. A cloud computing environment may provide user client 1002, verifier client 1003, digital wallet provider client 1009, third-party cosigner client 1005, and validator client 1007 with one or more resources provided by a network environment. The cloud computing environment may include one or more user clients 1002a-1002n, one or more verifier clients 1003a-1003n, one or more digital wallet provider clients 1009a-1009n, one or more third-party cosigner clients 1005a-1005n, and one or more validator clients 1007a-1007n in communication with the cloud 1008 over one or more networks 1004. User clients 1002, verifier clients 1003, digital wallet provider clients 1009, third-party cosigner clients 1005, and validator clients 1007 may include, e.g., thick clients, thin clients, and zero clients. A thick client may provide at least some functionality even when disconnected from the cloud 1008 or servers providing the centralized or distributed ledgers 1006. A thin client or zero client may depend on the connection to the cloud 1008 or servers providing the centralized or distributed ledgers 1006 to provide functionality. A zero client may depend on the cloud 1008 or other networks 1004 or servers providing the centralized or distributed ledgers 1006 to retrieve operating system data for the user client device 1002, verifier client device 1003, digital wallet provider client device 1009, third-party cosigner client device 1005, and validator client device 1007. The cloud 1008 may include back end platforms, e.g., servers, storage, server farms or data centers.

The cloud 1008 may be public, private, or hybrid. Public clouds may include public servers that are maintained by third parties to the user client 1002, verifier client 1003, digital wallet provider client 1009, third-party cosigner client 1005, and validator client 1007, or the owners of the user client 1002, verifier client 1003, digital wallet provider client 1009, third-party cosigner client 1005, and validator client 1007. The servers may be located off-site in remote geographical locations as disclosed above or otherwise. Public clouds may be connected to servers over a public network. Private clouds may include private servers that are physically maintained by a user client 1002, verifier client 1003, digital wallet provider client 1009, third-party cosigner client 1005, and validator client 1007, or owners of a user client 1002, verifier client 1003, digital wallet provider client 1009, third-party cosigner client 1005, and validator client 1007. Private clouds may be connected to the servers over a private network 1004. Hybrid clouds may include both the private and public networks 1004 and servers.

The cloud 1008 may also include a cloud-based delivery, e.g. Software as a Service (SaaS) 1010, Platform as a Service (PaaS) 1012, and Infrastructure as a Service (IaaS) 1014. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Washington, Rackspace Cloud provided by Rackspace Inc. of San Antonio, Texas, Google Compute Engine provided by Google Inc. of Mountain View, California, or RightScale provided by RightScale, Inc. of Santa Barbara, California PaaS providers may offer functionality provided by IaaS, including, e.g., storage, networking, servers or virtualization, as well as additional resources, e.g., the operating system, middleware, or runtime resources. Examples of PaaS include Windows Azure provided by Microsoft Corporation of Redmond, Washington, Google App Engine provided by Google Inc., and Heroku provided by Heroku, Inc. of San Francisco California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, California, or Office365 provided by Microsoft Corporation. Examples of SaaS may also include storage providers, e.g. Dropbox provided by Dropbox Inc. of San Francisco, California, Microsoft OneDrive provided by Microsoft Corporation, Google Drive provided by Google Inc., or Apple iCloud provided by Apple Inc. of Cupertino, California.

User clients 1002, verifier clients 1003, digital wallet provider clients 1009, third-party cosigner clients 1005, and validator clients 1007 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). User clients 1002, verifier clients 1003, digital wallet provider clients 1009, third-party cosigner clients 1005, and validator clients 1007 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. User clients 1002, verifier clients 1003, digital wallet provider clients 1009, third-party cosigner clients 1005, and validator clients 1007 may access SaaS resources through the use of web-based user interfaces, provided by a web browser (e.g. Google Chrome, Microsoft Internet Explorer, or Mozilla Firefox provided by Mozilla Foundation of Mountain View, California). User clients 1002, verifier clients 1003, digital wallet provider clients 1009, third-party cosigner clients 1005, and validator clients 1007 may also access SaaS resources through smartphone or tablet applications, including e.g., Salesforce Sales Cloud, or Google Drive App. User clients 1002, verifier clients 1003, digital wallet provider clients 1009, third-party cosigner clients 1005, and validator clients 1007 may also access SaaS resources through the client operating system, including e.g. Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

User clients 1002, verifier clients 1003, digital wallet provider clients 1009, third-party cosigner clients 1005, validator clients 1007, and centralized or distributed ledgers 1006 may be deployed as and/or executed on any type and form of computing device, e.g., a computer, network device or appliance capable of communicating on any type and form of network and performing the operations described herein.

Figure 10C:
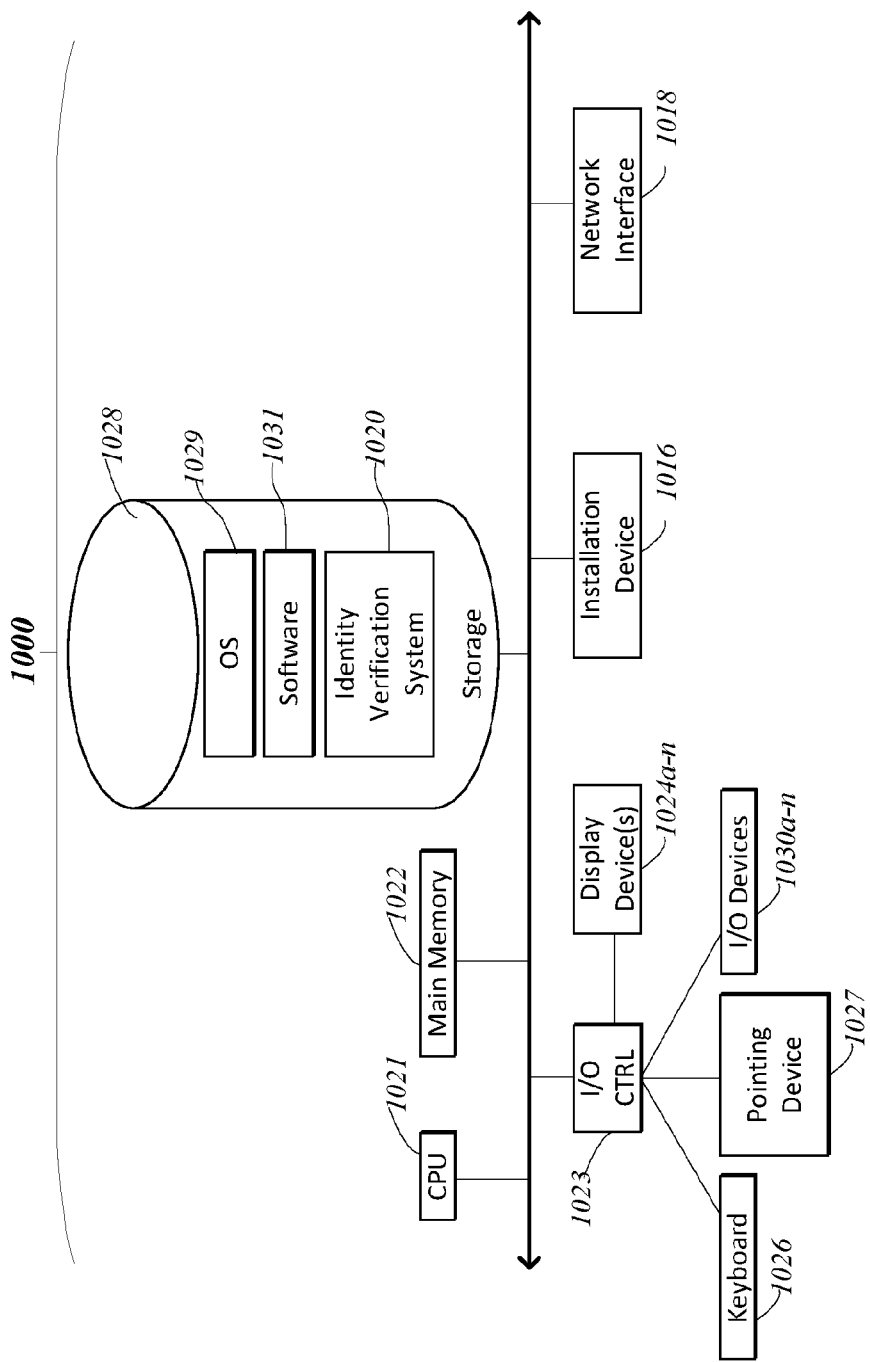
FIGS. 10C and 10D are block diagrams depicting embodiments of computing devices useful in connection with the methods and systems described herein.
Figure 10D:
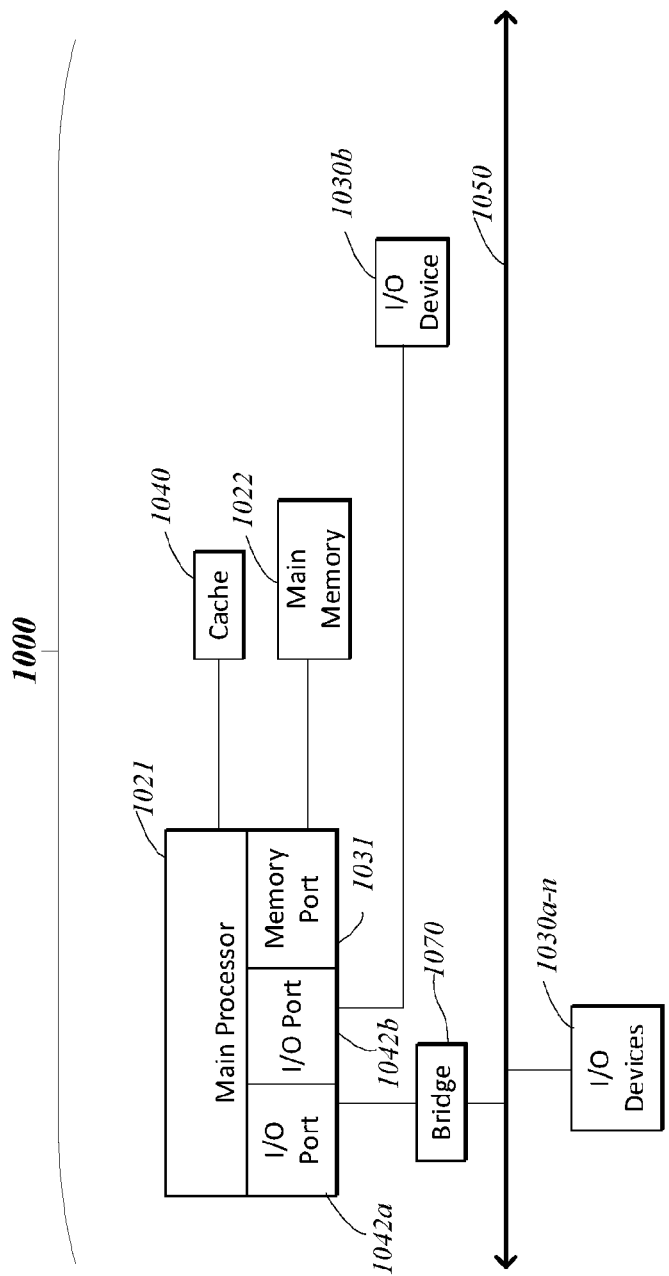

FIGS. 10C and 10D depict block diagrams of a computing device 10000 useful for practicing an embodiment of attestor clients 1001, user clients 1002, verifier clients 1003, digital wallet provider clients 1009, third-party cosigner clients 1005, or validator clients 1007. As shown in FIGS. 10C and 10D, each computing device 1000 includes a central processing unit 1021, and a main memory unit 1022. As shown in FIG. 10C, a computing device 1000 may include a storage device 1028, an installation device 1016, a network interface 1018, and I/O controller 1023, display devices 1024a-1024n, a keyboard 1026 and a pointing device 1027, e.g., a mouse. The storage device 1028 may include, without limitation, an operating system 1029, software 1031, and a software of a simulated phishing attack system 1020. As shown in FIG. 10D, each computing device 1000 may also include additional optional elements, e.g., a memory port 1031, a bridge 1070, one or more input/output devices 1030a-1030n (generally referred to using reference numeral 1030), and a cache memory 1040 in communication with the central processing unit 1021.

The central processing unit 1021 is any logic circuitry that responds to and processes instructions fetched from the main memory unit 1022. In many embodiments, the central processing unit 1021 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 1000 may be based on any of these processors, or any other processor capable of operating as described herein. The central processing unit 1021 may utilize instruction level parallelism, thread level parallelism, different levels of cache, and multi-core processors. A multi-core processor may include two or more processing units on a single computing component. Examples of multi-core processors include the AMD PHENOM IIX2, INTER CORE i5 and INTEL CORE i7.

Main memory unit 1022 may include on or more memory chips capable of storing data and allowing any storage location to be directly accessed by the microprocessor 1021. Main memory unit 1022 may be volatile and faster than storage 1028 memory. Main memory units 1022 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 1022 or the storage 1028 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 1022 may be based on any of the above described memory chips, or any other available memory chips capable of operating as described herein. In the embodiment shown in FIG. 10C, the processor 1021 communicates with main memory 1022 via a system bus 1050 (described in more detail below). FIG. 10D depicts an embodiment of a computing device 1000 in which the processor communicates directly with main memory 1022 via a memory port 1031. For example, in FIG. 10D the main memory 1022 may be DRDRAM.

FIG. 10D depicts and embodiment in which the main processor 1021 communicates directly with cache memory 1040 via a secondary bus, sometimes referred to as a backside bus. In other embodiments, the main processor 1021 communicates with cache memory 1040 using the system bus 1050. Cache memory 1040 typically has a faster response time than main memory 1022 and is typically provided by SRAM, BSRAM, or EDRAM. In the embodiment shown in FIG. 10D, the processor 1021 communicates with various I/O devices 1030 via a local system bus 1050. Various buses may be used to connect the central processing unit 1021 to any of the I/O devices 1030, including a PCI bus, a PCI-X bus, or a PCI-Express bus, or a NuBus. For embodiments in which the I/O device is a video display 1024, the processor 1021 may use an Advanced Graphic Port (AGP) to communicate with the display 1024 or the I/O controller 1023 for the display 1024. FIG. 10D depicts and embodiment of a computer 1000 in which the main processor 1021 communicates directly with I/O device 1030b or other processors 1021' via HYPERTRANSPORT, RAPIDIO, or INFINIBAND communications technology. FIG. 10D also depicts an embodiment in which local busses and direct communication are mixed: the processor 1021 communicates with I/O device 1030a using a local interconnect bus while communicating with I/O device 1030b directly.

A wide variety of I/O devices 1030a-1030n may be present in the computing device 10000. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 1030a-1030n may include a combination of multiple input or output devices, including, e.g., Microsoft KINECT, Nintendo Wiimote for the WII, Nintendo WII U GAMEPAD, or Apple iPhone. Some devices 1030a-1030n allow gesture recognition inputs through combining some of the inputs and outputs. Some devices 1030a-1030n provide for facial recognition which may be utilized as an input for different purposes including authentication and other commands. Some devices 1030a-1030n provide for voice recognition and inputs, including, e.g., Microsoft KINECT, SIRI for iPhone by Apple, Google Now or Google Voice Search, and Alexa by Amazon.

Additional devices 1030a-1030n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 1030a-1030n, display devices 1024a-1024n or group of devices may be augmented reality devices. The I/O devices may be controlled by an I/O controller 1023 as shown in FIG. 10C. The I/O controller may control one or more I/O devices, such as, e.g., a keyboard 126 and a pointing device 1027, e.g., a mouse or optical pen. Furthermore, an I/O device may also provide storage and/or an installation medium 1016 for the computing device 1000. In still other embodiments, the computing device 1000 may provide USB connections (not shown) to receive handheld USB storage devices. In further embodiments, a I/O device 1030 may be a bridge between the system bus 1050 and an external communication bus, e.g. a USB bus, a SCSI bus, a FireWire bus, an Ethernet bus, a Gigabit Ethernet bus, a Fiber Channel bus, or a Thunderbolt bus.

In some embodiments, display devices 1024a-1024n may be connected to I/O controller 1023. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 1024a-1024n may also be a head-mounted display (HMD). In some embodiments, display devices 1024a-1024n or the corresponding I/O controllers 1023 may be controlled through or have hardware support for OPENGL or DIRECTX API or other graphics libraries.

In some embodiments, the computing device 1000 may include or connect to multiple display devices 1024a-1024n, which each may be of the same or different type and/or form. As such, any of the I/O devices 1030a-1030n and/or the I/O controller 1023 may include any type and/or form of suitable hardware, software, or combination of hardware and software to support, enable or provide for the connection and use of multiple display devices 1024a-1024n by the computing device 1000. For example, the computing device 1000 may include any type and/or form of video adapter, video card, driver, and/or library to interface, communicate, connect or otherwise use the display devices 1024a-1024n. In one embodiment, a video adapter may include multiple connectors to interface to multiple display devices 1024a-1024n. In other embodiments, the computing device 1000 may include multiple video adapters, with each video adapter connected to one or more of the display devices 1024a-1024n. In some embodiments, any portion of the operating system of the computing device 1000 may be configured for using multiple displays 1024a-1024n. In other embodiments, one or more of the display devices 1024a-1024n may be provided by one or more other computing devices 1000a or 100b connected to the computing device 1000, via the network 1004. In some embodiments, software may be designed and constructed to use another computer's display device as a second display device 1024a for the computing device 1000. For example, in one embodiment, an Apple iPad may connect to a computing device 1000 and use the display of the device 100 as an additional display screen that may be used as an extended desktop. One ordinarily skilled in the art will recognize and appreciate the various ways and embodiments that a computing device 1000 may be configured to have multiple display devices 1024a-1024n.

Referring again to FIG. 10C, the computing device 1000 may comprise a storage device 1028 (e.g. one or more hard disk drives or redundant arrays of independent disks) for storing an operating system or other related software, and for storing application software programs such as any program related to the software 120. Examples of storage device 1028 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 1028 may be non-volatile, mutable, or read-only. Some storage device 1028 may be internal and connect to the computing device 1000 via a bus 1050. Some storage device 1028 may be external and connect to the computing device 1000 via a I/O device 1030 that provides an external bus. Some storage device 1028 may connect to the computing device 1000 via the network interface 1018 over a network 1004, including, e.g., the Remote Disk for MACBOOK AIR by Apple. Some client devices 100 may not require a non-volatile storage device 1028 and may be thin clients or zero equipment clients 1002 and/or operator clients 1003. Some storage device 1028 may also be used as an installation device 1016 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 1000 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on attestor clients 1001, user clients 1002, verifier clients 1003, digital wallet provider clients 1009, third-party cosigner clients 1005, or validator clients. An application distribution platform may include a repository of applications on a server or a cloud 1008, which attestor clients 1001, user clients 1002, verifier clients 1003, digital wallet provider clients 1009, third-party cosigner clients 1005, or validator clients 1007 may access over a network 1004. An application distribution platform may include application developed and provided by various developers. A user of an attestor client 1001, user client 1002, verifier client 1003, digital wallet provider client 1009, third-party cosigner client 1005, or validator client 1007 may select, purchase and/or download an application via the application distribution platform.

Furthermore, the computing device 1000 may include a network interface 1018 to interface to the network 1004 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, the computing device 1000 communicates with other computing devices 1000' via any type and/or form of gateway or tunneling protocol e.g. Secure Socket Layer (SSL) or Transport Layer Security (TLS), or the Citrix Gateway Protocol manufactured by Citrix Systems, Inc. The network interface 1018 may comprise a built-in network adapter, network interface card, PCMCIA network card, EXPRESSCARD network card, card bus network adapter, wireless network adapter, USB network adapter, modem or any other device suitable for interfacing the computing device 1000 to any type of network capable of communication and performing the operations described herein.

A computing device 1000 of the sort depicted in FIGS. 10B and 10C may operate under the control of an operating system, which controls scheduling of tasks and access to system resources. The computing device 1000 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Washington; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

The computing device 1000 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 1000 has sufficient processor power and memory capacity to perform the operations described herein. In some embodiments, the computing device 1000 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 1000 is a gaming system. For example, the computing device 1000 may comprise a PLAYSTATION 3, or PERSONAL PLAYSTATION PORTABLE (PSP), or a PLAYSTATION VITA device manufactured by the Sony Corporation of Tokyo, Japan, or a NINTENDO DS, NINTENDO 3DS, NINTENDO WII, or a NINTENDO WII U device manufactured by Nintendo Co., Ltd., of Kyoto, Japan, or an XBOX 360 device manufactured by Microsoft Corporation.

In some embodiments, the computing device 1000 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 1000 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 1000 is a tablet e.g. the IPAD line of devices by Apple; GALAXY TAB family of devices by Samsung; or KINDLE FIRE, by Amazon.com, Inc. of Seattle, Washington. In other embodiments, the computing device 1000 is an eBook reader, e.g. the KINDLE family of devices by Amazon.com, or NOOK family of devices by Barnes & Noble, Inc. of New York City, New York.

In some embodiments, attestor client 1001, user client 1002, verifier client 1003, digital wallet provider client 1009, third-party cosigner client 1005, or validator client 1007 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, attestor client 1001, user client 1002, verifier client 1003, digital wallet provider client 1009, third-party cosigner client 1005, or validator client 1007 is a laptop or desktop computer equipped with a web browser and a microphone and speaker system, e.g. a telephony headset. In these embodiments, attestor client devices 1001a-1001n, user client devices 1002a-1002n, verifier client devices 1003a-1003n, digital wallet provider client devices 1009a-1009n, third-party cosigner client devices 1005a-1005n, or validator client devices 1007a-1007n are web-enabled and can receive and initiate phone calls. In some embodiments, a laptop or desktop computer is also equipped with a webcam or other video capture device that enables video chat and video call.

In some embodiments, the status of one or more machines 1001, 1002, 1003, 1005, 1007 and/or 1009 in the network 1004 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

Figure 11:
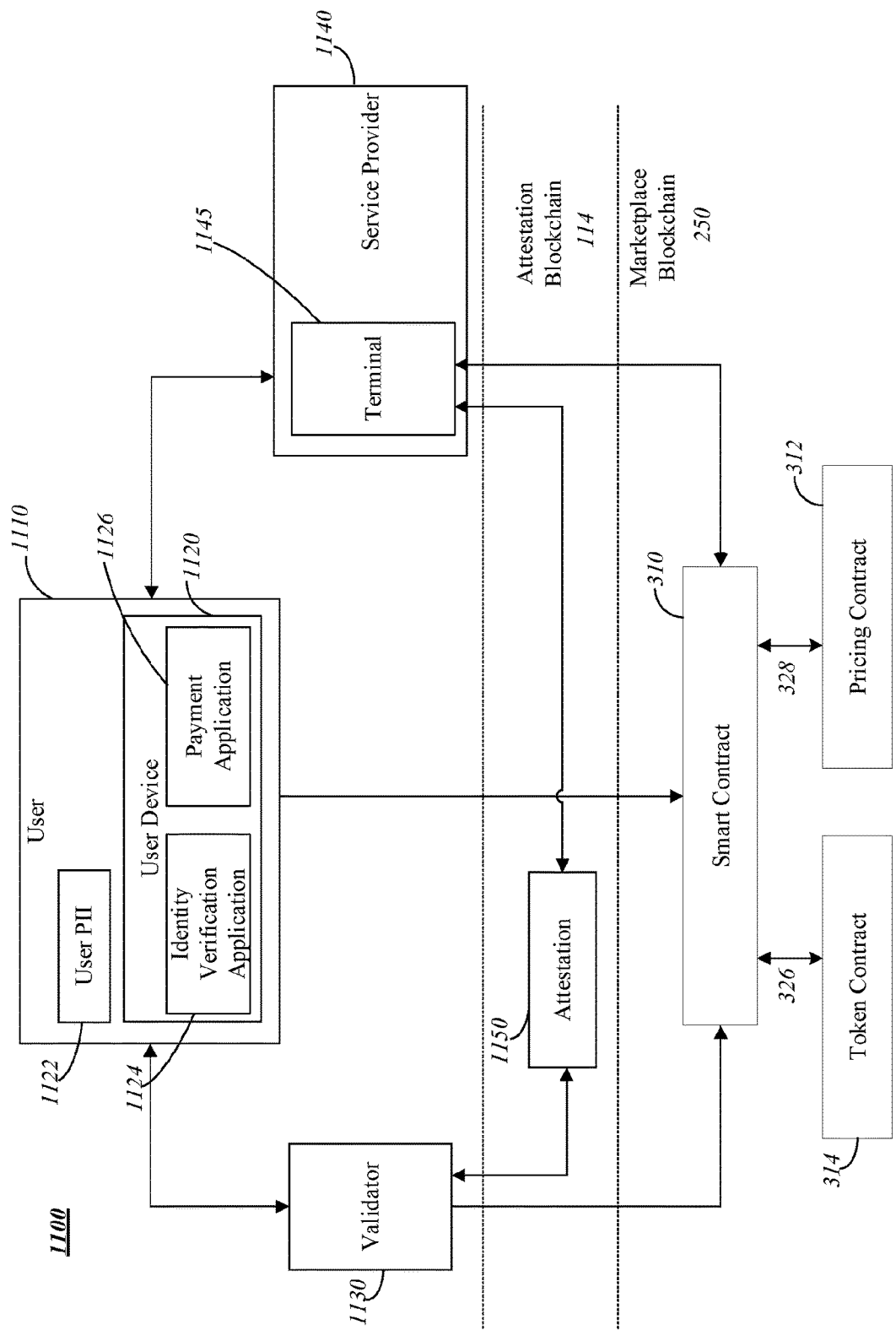

Section C. Embodiments of Systems and Methods Useful for Determining the Eligibility of Users for Access to Restricted Goods and Services In a general overview, FIG. 11 shows an illustration of a payment platform configured to interact with an online identity verification system 1100 that enables a vending machine to verify that a user is the correct age to purchase a product. System 1100 may be used by or be associated with a user 1110. User 1110 may use, or be in control of, user device 1120. In some examples, identity verification application 1124 and payment application 1126 may execute on user device 1120. In some examples, an interface to a cloud-based or cloud-enabled identity verification application may be accessible on user device 1120. In some examples, an interface to a cloud-based or cloud-enabled payment application may be accessible on user device 1120. User 1110 may have personally identifiable information (PII) 1122. User PII 1122 may be accessible through identity verification application 1124. System 1100 includes validator 1130 and service provider 1140. In some embodiments, service provider 1140 may also be referred to as a requester. In some examples, service provider 1140 is capable of interfacing with user 1110 through service provider terminal 1145. In some embodiments, system 1100 may utilize blockchain 114, on which may be stored an attestation 1150. In examples, system 100 may use any centralized or distributed ledger or storage. System 1100 may utilize smart contract 310, for example enabled on marketplace blockchain 250. The smart contract may utilize a token contract 315 and a pricing contract 312.

Referring to FIG. 11 in more detail, user 1110 may be an individual that has aspects of personally identifiable information (PII) 1122 associated with them. In some embodiments, user's date of birth is an aspect of PII 1122 associated with user 1110. Other examples of PII may be a user's home address, a user's national registration number (such as a social security number), a user's eye color, biometric information of a user such as fingerprints or eye scans, and so on. User 1110 may have user device 1120. In some embodiments, user device 1120 may be a personal computer or a laptop computer. In some embodiments, user device 1120 may be a portable computing device such as a tablet or a smartphone. User device 1120 may be a shared device on which user 1110 has a user profile which is accessible to user 1110 by entering a password or pin or other code which is private and known only to user 1110. In some examples, user device 1120 may be a smart watch which may have direct connectivity to a network or may have connectivity to a network through a separate device controlled by user 1110, such as a smartphone. User device 1120 may be a connected car. In general, user device 1120 may be any connected device for which all or a partition of the device is solely under control of the user. In some embodiments, user PII 1122 is stored on user device 1120. In some embodiments, an identity verification application 1124 may execute on user device 1120. In some embodiments, a payment application 1126 may execute on user device 1120. Identity verification application 1124 may be associated with or included in payment application 1126, or payment application 1126 may be associated with or included in identity verification application 1124. In some embodiments, user PII 1122 is accessed by user 1110 via identity verification application 1124 configured to execute instructions that enable functionality of system 1100. In some embodiments, user 1110 provides user PII 1122 to identity application 1124 configured to execute instructions that enable functionality of system 1100.

System 1100 may include validator 1130. Validator 1130 is trusted by some service providers to authenticate user PII 1122. Validator 1130 may attest to the accuracy, veracity and ownership of user PII 1122. Validator 1130 may determine that PII 1122 is associated with user 1110, or under the control of user 1110. Validator 1130 may determine that PII 1122 is factually correct. Validator 1130 may determine that PII 1122 is currently valid. This may be done via verification with third party databases (e.g. state or federal maintained databases), via verification with other third parties (e.g. banks, credit reporting agencies, or any other such third parties), or via other verification (e.g. affidavits, escrow services, etc.).

In some examples, if validator 1130 may determines that user PII 1122 is authentic, current, and under the control of user 1110, validator 1130 may an attestation 1150 of the user's PII 1122. In some examples, attestation 1150 may be associated with an attestation address on attestation blockchain 114, at which a transaction can be made. In some examples, attestation 1150 may be stored in any centralized or distributed ledger or storage. In examples, attestation 1150 of user's PII 1122 may be stored locally by validator 1130. In some examples, attestation 1150 comprises attested personally identifiable information 1122 of user 1110. In some examples, attestation 1150 comprises an attestation address, which may be an index into a storage, for example a centralized or distributed ledger. In examples, attestation 1150 comprising user's PII 1122 may comprise public keys of validator 1030, user 1100, and one or more additional parties, for example third party cosigner client 1005 and/or digital wallet provider client 1009 using a multisig protocol. In embodiments, attestation 1150 of the user's PII 1122 may be stored on a cloud storage accessible to one or more of validator 1130, service provider 1140, and user 1100. In examples, attestation 1150 may comprise attestation address comprised of an encrypted form of user's PII 1122. Validator 1130 may be an entity or service provider that is trusted to validate a user's PII. In some embodiments, validator 1130 may be a financial institution such as a bank, a government entity, or utility company. In some embodiments, validator 1130 may be a single individual or a group of people who collectively form a trusted network.

System 1100 may include service provider 1140. In a general overview, service provider 1140 is an entity that wishes to interact with users to provide goods or services and to accept payment for goods and services. In some embodiments, service provider 1140 is a physical entity, such as a person. In some embodiments, service provider 1140 may include terminal 1145. In some examples, terminal 1145 is a vending machine. In some examples, terminal 1145 is a point of sale terminal. In some examples, terminal 1145 is a kiosk. Terminal 1145 may be any extension of service provider 1140 which provides an interface to service provider's goods and services and which accepts payment for service provider's goods and services.

System 1000 may include attestation 1050. Attestation 1050 may be represented as a transaction on attestation blockchain 114 at an attestation address. In some examples, attestation 1050 comprises attested personally identifiable information 1022 of user 1010. In some examples, attestation 1050 comprises an attestation address at which a finite amount of cryptocurrency is stored when the attestation is not revoked or invalid (e.g. a cryptocurrency dust value, or a minimum value of a currency or tokens required to execute a transaction; such minimum value may have negligible monetary value, such as a fraction of a cent).

System 1100 may include smart contract 310. In some embodiments, smart contract 310 exists on marketplace blockchain 250 or any other storage. In some embodiments, marketplace blockchain 250 and attestation blockchain 114 are the same blockchain. In some embodiments, system 1100 includes token contract 314. In some embodiments, system 1100 includes pricing contract 312.

The user possesses personally identifiable information (PII). In some examples, when the user has had PII validated by a validator, an attestation of the user's PII is created by the validator for that PII. In some embodiments, the validator will send a copy of the attestation to the user for storage on the user's device. In examples, the validator may store a copy of the attestation on a shared storage, for example a cloud storage or server storage.

When the user receives a request for information from a requester (for example a service provider), the user may provide to the requester the requested information in plain text format, as well as in a hash identical to the hash function used in deriving the attestation address. In some implementations, the user may provide the attestation of the information that was sent to the user by the validator. The user sends to the requester information about the validator and any other cosigners to the attestation as well as any other information needed to recreate the attestation address. The requester is then able to take the user's PII as well as the information sent by the user and recreate the attestation address and to look for a valid transaction at this attestation address on attestation blockchain 114. In some embodiments, requester (for example service provider) derives the attestation address and uses this address as a pointer into a storage, in order to determine if the information associated with the attestation address is still validated and current. If a transaction or value at the recreated attestation address is found on the blockchain or in the storage, the requester has verified that the information sent by the user accurately represents the user's PII.

FIG. 12 describes an embodiment of a method by which system 1100 can be used to validate eligibility for a user to access a restricted good such that the user may purchase the good. In step 1200, user 1110 approaches service provider 1140 attempting to purchase a good. In step 1210, service provider 1140 indicates to user 1110 that user 1110 must meet certain eligibility requirements in order to purchase the good or service offered by service provider 1140 and specifies the eligibility requirements (e.g. minimum age or other such requirements). In step 1230, service provider 1140 sends information to user 1110 indicating what PII service provider 1140 requires for user 1110 to access the good. In some embodiments, service provider 1140 indicates to user 1110 which validator 1130 service provider 1140 trusts to provide a validation of the user information. In step 1230, user 1110, for example using user identification verification application on user device 1120, provides information to service provider 1140 that indicates user 1110 is eligible to purchase the good offered by service provider 1140. In step 1240, user 1110 provides the requested information to service provider 1140. In step 1250, service provider 1140 validates the information provided by user 1110. Responsive to validating the information provided by the user, in step 1260 service provider 1140 determines if user 1110 is eligible to purchase the good.

Describing FIG. 12 in more detail, FIG. 12 describes a method by which system 1100 can be used to validate eligibility for a user to access a restricted good. In step 1200, user 1110 approaches service provider 1140 attempting to purchase a good. In some embodiments, user 1110 approaches a terminal 1145 of service provider 1140. In some embodiments, user 1110 wishes to purchase or use a service. In one example, user 1110 wishes to purchase an alcoholic beverage, and there is an age of eligibility in order to purchase an alcoholic beverage. In another example, user 1110 wishes to rent a car, and user 1110 must be a minimum age in order to rent a car. In some examples, the terminal 1145 of service provider 1140 is a vending machine associated with the service provider in order to purchase a good. In some examples, a user approaches an alcohol vending machine associated with a brewery in order to purchase a beer. In other examples, service provider 1140 may be a national border patrol situated at a border between two countries or nations and responsible for determining eligibility of users to pass through the border.

In step 1210, service provider 1140 indicates to user 1110 that user must meet certain eligibility requirements in order to purchase the good offered or access the services provided by service provider 1140. In an example, a vending machine associated with the service provider indicates to user 1110 that the user must be of a certain age in order to purchase an alcoholic beverage. In some examples, the vending machine indicates to the user that the user must be 21 years of age to purchase a beer. In some embodiments, the vending machine displays the indication to the user on a visual display. In some embodiments, the vending machine uses voice technology to indicate to the user that the user must be a certain age in order to purchase an alcoholic beverage. In another example, a national border patrol may indicate to a user that the user must be of a specific nationality or have specific travel visa or authorization credentials to enter a country.

In some embodiments, as shown in optional step 1220, service provider 1140 sends information to user 1110 indicating specifically what PII service provider 1140 requires in order to determine eligibility for user 1110 to access the good. In examples, service provider 1140 indicates which one or more validators 1130 service provider 1140 trusts to provide a validation of the PII that service provider 1140 requires from user 1110. In some examples, user 1110 wishes to purchase an alcoholic beverage from a vending machine terminal 1145 of a brewery 1140. In embodiments, the brewery 1140 indicates to user 1110 via the vending machine 1145 that the brewery requires the user's date of birth, in addition to a list of one or more potential validators 1130 that the brewery 1140 trusts to attest to the user's date of birth. In some embodiments, the vending machine 1145 communicates one or more PII requirements to an identity verification application 1124 on user's device. In some embodiments, service provider communicates one or more trusted validators to the user (for example a government agency, such as a registry of motor vehicles).

In step 1230, user 1110 provides information to service provider 1140 that indicates that user is eligible to purchase the good or access the services provided by service provider 1140. In some examples, an identity verification application 1124 on user device 1120 uses near field communication (NFC) to communicate with a terminal 1145 associated with service provider 1140 in order to indicate that user 1110 is eligible to purchase the good offered. In some examples, user 1110 indicates using a user interface on a terminal of the service provider that user 1110 is eligible to purchase the good. In examples, user 1110 provides information to service provider 1140 via terminal 1145. In embodiments, the information that user 1110 provides to service provider 1140 has not previously validated or attested to by a validator. In an example, user may provide the user's age to the service provider, which is not a piece of information that the user has previously had validated or attested to. In some embodiments, the information that user 1110 provides to service provider 1140 indicates that user is eligible to purchase the good or service offered. In embodiments, the user 1110 provides information using an identity verification application on a user device 1120. In some examples, an identity verification application or a payment application on a user device 1120 displays a QR code that can be read by a terminal associated with the service provider. In embodiments, instead of the user providing information to the service provider 1140, the user provides a key which gives the service provider permission to access the information from a different party, for example a different service provider that is trusted. In some examples, the information sent by the user to the service provider includes a public key of a validator that is trusted by the service provider. In some examples, the information sent by the user to the service provider includes one or more public keys of third parties that were signatories of the PII that was attested to by a validator that is trusted by the service provider. In examples, a key provided by the user which gives the service provider permission to access the information from a different party has a finite validity period, after which it expires.

In step 1240, user 1110 provides the requested information to service provider 1140. In some embodiments, user 1110 triggers user device 1120 to release requested information to service provider 1140 through interaction with a user interface on user device 1120. In some examples, identity verification application 1124 or payment application 1126 on user device 1120 releases the requested information to service provider 1140 without any required action by the user. In some examples, the requested information includes user PII 1122 in addition to information about a trusted validator that has previously attested to the user PII 1122. In some embodiments, user 1110 sends requested information along with metadata related to a previous attestation of the requested information. In some examples, in addition to the requested information, the user sends the attestation of the requested information. In some examples, the user sends a URL or storage location or identifier at which the requestor can access the requested information. In embodiments, user 1110 sends a blockchain address, for example on attestation blockchain 114. In embodiments, the user provides a certificate that includes the requested information that has been certified by a certificate authority. In some examples, the information sent from the user to the service provider is protected by end to end encryption. In some examples, the user sends the information to the service provider over a wireless communication link. In some examples, the user sends the information to the service provider over a cabled link. In some examples, the information requested by the service provider is embedded into a QR code which is displayed on a user device and scanned by the service provider.

In some examples, the information requested by the service provider has not already been attested to by a validator that is trusted by the service provider. In this case, in some examples user 1110 is prompted to begin an attestation protocol as previously described using an identity verification application 1124 on a user device 1120 with a validator 1130 that the service provider has indicated is trusted. In some examples user 1110 becomes a client of the validator for the purposes of having the user's information attested to by the validator. In some examples the user pays the validator to attest to the user's information. In some examples, the user receives payment from a party in the system 1100 for getting user information attested to. In some examples, the validator receives payment from the requestor, for attesting to the user's information.

In step 1250, service provider 1140 validates the information provided by user 1110. In embodiments, service provider 1140 creates an attestation using the information provided by user 1110 and verifies that the attestation created by service provider 1140 is the same as the attestation that can be found on attestation blockchain 114 or another storage or centralized or distributed ledger. In some embodiments, service provider 1140 uses information that was sent by user 1110 in order to create the attestation of the user information. In examples, service provider 1140 uses a storage location or blockchain address provided by user 1110 to find an attestation of the user PII on attestation blockchain 114 or any other storage or centralized or distributed ledger. In some embodiments, service provider uses information sent by user 1110 to create an address at which to find the attestation on the attestation blockchain 114 or any other storage or centralized or distributed ledger. In some examples, service provider uses information about a hashing algorithm and a one or more public keys to derive an attestation address at which to locate the attestation of the user's required PII. In examples, service provider 1140 provides user PII 1122 to a validator and requests that the validator validates the information on behalf of service provider 1140.

Responsive to validating the information provided by user 1110, service provider 1140 determines if user 1110 is eligible to purchase the good or the service. In examples, the information provided by user 1110 does not by itself determine that the user meets the eligibility requirements. For example, where there is an age restriction to providing a good or service, and the user provides their date of birth, the user has not provided their age however their age can be derived from their date of birth if the date of birth is verified. In other examples, the eligibility requirement for the user to access the restricted good or service depends on their age and also on the location of the terminal 1145 of service provider 1140. The service provider 1140 may derive the age requirement based on the geographic location of the terminal (e.g. the drinking age requirement of the country, province, or state that the terminal is in), in addition to the user's date of birth. In some embodiments, service provider 1140 derives the user's eligibility from the user's personal identification information. In one example, the service provider determines the user's age from the user's birthdate. In some examples, the service provider determines the user's eligibility by deriving the user's age from validated user information and comparing the user's age to a minimum age required to purchase the good. In some examples, the service provider compares the user's birthday to a date before which the user would have had to be born in order to be eligible to purchase the good. In some examples, if the user is eligible to purchase the good, the service provider accepts payment from the user, for example using payment application 1126 on user divide to provide the good to the user. In some examples, if the user is eligible to purchase the good, the service provider sends an indication to the user to inform the user that they are eligible to obtain the desired good or service. In one example, the service provider issues a ticket or token to the user as proof that the user is eligible to obtain a good or service. In some examples, the service provider may create a bracelet or other wearable indication of eligibility for the user.

The systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMS, RAMS, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A method for identity verification to provide access to restricted goods or services, comprising:
    receiving, by a first device from a second device operated on behalf of a user, a first request to purchase a restricted good or service;
    transmitting, by the first device to the second device responsive to the first request, a second request comprising an identification of information of the user, and an identification of a validation system;
    receiving, by the first device from the second device responsive to the second request, the requested information of the user;
    generating, by the first device, an attestation key comprising a hash of the requested information of the user and the identification of the validation system;
    transmitting a request, by the first device to a third device maintaining a centralized or distributed ledger, a request for a transaction value at an address corresponding to the attestation key;
    receiving, by the first device from the third device, an identification that a transaction value at the address corresponding to the attestation key exists, and that the transaction value is non-zero; and
    responsive to receipt of the identification that the transaction value at the address corresponding to the attestation key exists and is non-zero, providing the restricted good or service to the user.

2. The method of claim 1, wherein the first device comprises a vending machine holding an age-restricted product;
    wherein the requested information of the user comprises an age or birthdate; and
    wherein providing the restricted good or service further comprises controlling a product dispensing system of the first device to release the age-restricted product.

3. The method of claim 1, wherein the first device controls access to an age-restricted service;
    wherein the requested information of the user comprises an age or birthdate; and
    wherein providing the restricted good or service further comprises controlling a product dispensing system of the first device to release a wearable indication indicating the user is eligible to receive the age-restricted service.

4. The method of claim 1, wherein receiving the requested information of the user further comprises reading a visual code output by a display of the second device, by a camera of the first device, the visual code encoding the requested information of the user.

5. The method of claim 1, wherein the second request further comprises an identification of a plurality of validation systems; and
    wherein receiving the requested information of the user further comprises receiving, by the first device from the second device responsive to the second request, a selection of one of the validation systems of the plurality of validation systems.

6. The method of claim 1, wherein receiving the requested information of the user further comprises receiving a response comprising the attestation key, by the first device from the second device; and wherein generating the attestation key further comprises extracting the attestation key from the response.

7. The method of claim 6, wherein the attestation key comprises a cryptographic one-way hash, such that the first device cannot recover the requested information of the user from the attestation key.

8. The method of claim 1, wherein the request to purchase the restricted good or service further comprises an identification of a purchase eligibility.

9. The method of claim 1, further comprising:
receiving, by the first device from a third device operated on behalf of a second user, a third request to purchase the restricted good or service;
transmitting, by the first device to the third device responsive to the third request, a fourth request comprising an identification of information of the second user, and an identification of the validation system;
receiving, by the first device from the third device responsive to the fourth request, the requested information of the second user;
generating, by the first device, a second attestation key comprising a hash of the requested information of the second user and the identification of the validation system;
determining, by the first device, that a record in a distributed ledger at an address corresponding to the second attestation key is associated with a zero transaction value or that said record does not exist in the distributed ledger; and
responsive to the determination that the record in the distributed ledger at the address corresponding to the second attestation key is associated with the zero transaction value or that said record does not exist in the distributed ledger, preventing access to the restricted good or service by the second user.

10. A method for identity verification to provide access to restricted goods or services, comprising:
providing, by a user via a first device to a second device, a first request to purchase a restricted good or service;
receiving, from the second device responsive to the first request, a second request comprising an identification of information of the user, and an identification of a validation system;
transmitting, by the user via the first device to the second device responsive to the second request, the requested information of the user, receipt of the requested information causing the second device to generate an attestation key comprising a hash of the requested information of the user and the identification of the validation system, transmit a request to a third device maintaining a centralized or distributed ledger for a transaction value at an address corresponding to the attestation key, receive an identification from the third device that a transaction value at the address corresponding to the attestation key exists and that the transaction value is non-zero; and
receiving the restricted good or service, by the user, access provided by the second device responsive to the determination that the record in the distributed ledger at the address corresponding to the attestation key is associated with the non-zero transaction value.

11. The method of claim 10, wherein the transmitting requested information of the user further comprises transmitting a response comprising the attestation key, via the first device to the second device; the attestation key comprising a cryptographic one-way hash, such that the second device cannot recover the requested information of the user from the attestation key.

12. A system for identity verification to provide access to restricted goods or services, comprising:
a first device, in communication with a second device operated on behalf of a user and a third device maintaining a centralized or distributed ledger, the first device comprising a verification engine and an access controller;
wherein the verification engine is configured to:
receive, from the second device, a first request to purchase a restricted good or service,
transmit, to the second device responsive to the first request, a second request comprising an identification of information of the user, and an identification of a validation system,
receive, from the second device responsive to the second request, the requested information of the user,
generate an attestation key comprising a hash of the requested information of the user and the identification of the validation system,
transmit, to the third device, a request for a transaction value at an address in the centralized or distributed ledger corresponding to the attestation key, and
receive, from the third device, an identification that a transaction value at the address corresponding to the attestation key exists, and that the transaction value is non-zero; and
wherein the access controller is configured to provide the restricted good or service to the user, responsive to receipt of the identification that the transaction value at the address corresponding to the attestation key exists and is non-zero.

13. The system of claim 12, wherein the first device comprises a vending machine holding an age-restricted product, and a product dispensing system;
wherein the requested information of the user comprises an age or birthdate; and
wherein the access controller is further configured to control the product dispensing system of the first device to release the age-restricted product.

14. The system of claim 12, wherein the first device controls access to an age-restricted service and comprises a product dispensing system holding one or more wearable indicators;
wherein the requested information of the user comprises an age or birthdate; and
wherein the access controller is further configured to control the product dispensing system of the first device to release a wearable indication indicating the user is eligible to receive the age-restricted service.

15. The system of claim 12, wherein the first device further comprises a camera, and wherein the verification engine is further configured to read a visual code output by a display of the second device, via the camera, the visual code encoding the requested information of the user.

16. The system of claim 12, wherein the second request further comprises an identification of a plurality of validation systems; and
wherein the verification engine is further configured to receive, from the second device responsive to the second request, a selection of one of the validation systems of the plurality of validation systems.

17. The system of claim 12 wherein the verification engine is further configured to receive a response comprising the attestation key, from the second device; and wherein generating the attestation key further comprises extracting the attestation key from the response.

18. The system of claim 17, wherein the attestation key comprises a cryptographic one-way hash, such that the first device cannot recover the requested information of the user from the attestation key.

19. The system of claim 12, wherein the request to purchase the restricted good or service further comprises an identification of a purchase eligibility.

20. The system of claim 12, wherein the verification engine is further configured to:
receive, from a third device operated on behalf of a second user, a third request to purchase the restricted good or service;
transmit, to the third device responsive to the third request, a fourth request comprising an identification of information of the second user, and an identification of the validation system;
receive, from the third device responsive to the fourth request, the requested information of the second user;
generate a second attestation key comprising a hash of the requested information of the second user and the identification of the validation system;
determine that a record in a distributed ledger at an address corresponding to the second attestation key is associated with a zero transaction value or that said record does not exist in the distributed ledger; and
responsive to the determination that the record in the distributed ledger at the address corresponding to the second attestation key is associated with the zero transaction value or that said record does not exist in the distributed ledger, prevent access to the restricted good or service by the second user.

21. A method for identity verification to provide access to restricted goods or services, comprising:
receiving, by a first device from a second device operated on behalf of a user, a first request to purchase a restricted good or service;
transmitting, by the first device to the second device responsive to the first request, a second request comprising an identification of information of the user, and an identification of the validation system;
receiving, by the first device from the second device responsive to the second request, the requested information of the user;
generating, by the first device, an attestation key comprising a hash of the requested information of the user and the identification of the validation system;
transmitting a request, by the first device to a third device maintaining a centralized or distributed ledger, a request for a transaction value at an address corresponding to the attestation key;
receiving, by the first device from the third device, an identification that a transaction value at the address corresponding to the attestation key is associated with a zero transaction value or that said record does not exist in the distributed ledger; and
responsive to receipt of the identification that the transaction value at the address corresponding to the attestation key is associated with a zero transaction value or that said record does not exist, preventing access to the restricted good or service by the second user.

* * * * *